United States Patent [19]
Hata

[11] Patent Number: 6,100,928
[45] Date of Patent: Aug. 8, 2000

[54] DIGITAL CAMERA WITH VARIABLE GAIN TO OFFSET EXPOSURE ERROR

[75] Inventor: Daisuke Hata, Saitama, Japan

[73] Assignee: Ricoh Company, Ltd., Tokyo, Japan

[21] Appl. No.: 08/897,053

[22] Filed: Jul. 18, 1997

[30] Foreign Application Priority Data

Jul. 19, 1996 [JP] Japan .................................. 8-190289
Jul. 15, 1997 [JP] Japan .................................. 9-190278

[51] Int. Cl.⁷ .................................................. H04N 5/235
[52] U.S. Cl. ........................ 348/229; 348/296; 348/405
[58] Field of Search ................................. 348/229, 230,
348/296, 297, 298, 404, 405, 390, 399,
419, 367, 362

[56] References Cited

U.S. PATENT DOCUMENTS

| | | | |
|---|---|---|---|
| 4,972,267 | 11/1990 | Kaneko et al. | 348/367 |
| 5,258,848 | 11/1993 | Kondo et al. | 348/229 |
| 5,379,075 | 1/1995 | Nagasawa et al. | 348/678 |
| 5,386,231 | 1/1995 | Shimizu et al. | 348/296 |
| 5,592,220 | 1/1997 | Ishii et al. | 348/367 |
| 5,606,392 | 2/1997 | Tintera et al. | 348/362 |
| 5,625,411 | 4/1997 | Inuiya et al. | 348/296 |
| 5,745,808 | 4/1998 | Tintera | 396/236 |
| 5,751,354 | 5/1998 | Suzuki et al. | 348/296 |
| 5,825,417 | 10/1998 | Yoshida | 348/364 |
| 5,847,756 | 12/1998 | Iura et al. | 348/363 |

FOREIGN PATENT DOCUMENTS 1-288070  11/1989  Japan .
2-60378    2/1990  Japan .

*Primary Examiner*—Wendy Garber
*Assistant Examiner*—Mitchell White
*Attorney, Agent, or Firm*—Oblon, Spivak, McClelland, Maier & Neustadt, P.C.

[57] ABSTRACT

In a digital camera, a gain for a variable gain amplifier is controlled by a controller so that when a signal level of an image signal for a CCD is corrected by the variable gain amplifier, a quantization error or an exposure error generated when a shutter speed is set by a unit of CCD electric charge sweep-away pulse will be offset.

16 Claims, 16 Drawing Sheets

FIG.3

| THEORETICAL VALUES | | LOAD VALUES | | | ΔTV | AGC |
|---|---|---|---|---|---|---|
| TV | 1/T (S) | LOAD VALUES | 1/T (S) | TV | | |
| 10.0000 | 1024.00 | 263 | 1081.53 | 10.0789 | -0.0789 | 35 |
| 10.0625 | 1069.34 | 263 | 1081.53 | 10.0789 | -0.0164 | 33 |
| 10.1250 | 1116.68 | 262 | 1161.36 | 10.1816 | -0.0566 | 34 |
| 10.1875 | 1166.12 | 261 | 1253.92 | 10.2922 | -0.1047 | 35 |
| 10.2500 | 1217.75 | 261 | 1253.92 | 10.2922 | -0.0422 | 33 |
| 10.3125 | 1271.66 | 260 | 1362.51 | 10.4121 | -0.0996 | 35 |
| 10.3750 | 1327.96 | 260 | 1362.51 | 10.4121 | -0.0371 | 33 |
| 10.4375 | 1386.76 | 259 | 1491.69 | 10.5427 | -0.1052 | 35 |
| 10.5000 | 1448.15 | 259 | 1491.69 | 10.5427 | -0.0427 | 33 |
| 10.5625 | 1512.27 | 258 | 1647.94 | 10.6864 | -0.1239 | 36 |
| 10.6250 | 1579.22 | 258 | 1647.94 | 10.6864 | -0.0614 | 34 |
| 10.6875 | 1649.14 | 258 | 1647.94 | 10.6864 | 0.0011 | 32 |
| 10.7500 | 1722.16 | 257 | 1840.74 | 10.8461 | -0.0961 | 35 |
| 10.8125 | 1798.40 | 257 | 1840.74 | 10.8461 | -0.0336 | 33 |
| 10.8750 | 1878.02 | 256 | 1840.74 | 11.0256 | -0.1506 | 37 |
| 10.9375 | 1961.17 | 256 | 2084.64 | 11.0256 | -0.0881 | 35 |
| 11.0000 | 2048.00 | 256 | 2084.64 | 11.0256 | -0.0256 | 33 |
| 11.0625 | 2138.67 | 255 | 2084.64 | 11.2306 | -0.1681 | 37 |
| 11.1250 | 2233.36 | 255 | 2403.04 | 11.2306 | -0.1056 | 35 |
| 11.1875 | 2332.24 | 255 | 2403.04 | 11.2306 | -0.0431 | 33 |
| 11.2500 | 2435.50 | 254 | 2403.04 | 11.4698 | -0.2198 | 39 |
| 11.3125 | 2543.32 | 254 | 2836.24 | 11.4698 | -0.1573 | 37 |
| 11.3750 | 2655.93 | 254 | 2836.24 | 11.4698 | -0.0948 | 35 |
| 11.4375 | 2773.52 | 254 | 2836.24 | 11.4698 | -0.0323 | 33 |
| 11.5000 | 2896.31 | 253 | 2836.24 | 11.7565 | -0.2565 | 40 |
| 11.5625 | 3024.54 | 253 | 3459.97 | 11.7565 | -0.1940 | 38 |
| 11.6250 | 3158.45 | 253 | 3459.97 | 11.7565 | -0.1315 | 36 |
| 11.6875 | 3298.28 | 253 | 3459.97 | 11.7565 | -0.0690 | 34 |
| 11.7500 | 3444.31 | 253 | 3459.97 | 11.7565 | -0.0065 | 32 |
| 11.8125 | 3596.80 | 252 | 4435.38 | 12.1148 | -0.3023 | 42 |
| 11.8750 | 3756.05 | 252 | 4435.38 | 12.1148 | -0.2398 | 40 |
| 11.9375 | 3922.34 | 252 | 4435.38 | 12.1148 | -0.1773 | 38 |
| 12.0000 | 4096.00 | 252 | 4435.38 | 12.1148 | -0.1148 | 36 |

301: THEORETICAL VALUES  
302: LOAD VALUES  
303: ΔTV / AGC

FIG.4

| THEORETICAL VALUES | | LOAD VALUES | | | ΔTV | AGC |
|---|---|---|---|---|---|---|
| TV | 1/T (S) | LOAD VALUES | 1/T (S) | TV | | |
| 10.0000 | 1024.00 | 264 | 1011.96 | 9.9829 | 0.0171 | 31 |
| 10.0625 | 1069.34 | 264 | 1011.96 | 9.9829 | 0.0796 | 29 |
| 10.1250 | 1116.68 | 263 | 1081.53 | 10.0789 | 0.0461 | 31 |
| 10.1875 | 1166.12 | 262 | 1161.36 | 10.1816 | 0.0059 | 32 |
| 10.2500 | 1217.75 | 262 | 1161.36 | 10.1816 | 0.0684 | 30 |
| 10.3125 | 1271.66 | 261 | 1253.92 | 10.2922 | 0.0203 | 31 |
| 10.3750 | 1327.96 | 261 | 1253.92 | 10.2922 | 0.0828 | 29 |
| 10.4375 | 1386.76 | 260 | 1362.51 | 10.4121 | 0.0254 | 31 |
| 10.5000 | 1448.15 | 260 | 1362.51 | 10.4121 | 0.0879 | 29 |
| 10.5625 | 1512.27 | 259 | 1491.69 | 10.5427 | 0.0198 | 31 |
| 10.6250 | 1579.22 | 259 | 1491.69 | 10.5427 | 0.0823 | 29 |
| 10.6875 | 1649.14 | 259 | 1491.69 | 10.5427 | 0.1448 | 27 |
| 10.7500 | 1722.16 | 258 | 1647.94 | 10.6864 | 0.0636 | 30 |
| 10.8125 | 1798.40 | 258 | 1647.94 | 10.6864 | 0.1261 | 28 |
| 10.8750 | 1878.02 | 257 | 1840.74 | 10.8461 | 0.0289 | 31 |
| 10.9375 | 1961.17 | 257 | 1840.74 | 10.8461 | 0.0914 | 29 |
| 11.0000 | 2048.00 | 257 | 1840.74 | 10.8461 | 0.1539 | 27 |
| 11.0625 | 2138.67 | 256 | 2084.64 | 11.0256 | 0.0369 | 31 |
| 11.1250 | 2233.36 | 256 | 2084.64 | 11.0256 | 0.0994 | 29 |
| 11.1875 | 2332.24 | 256 | 2084.64 | 11.0256 | 0.1619 | 27 |
| 11.2500 | 2435.50 | 255 | 2403.04 | 11.2306 | 0.0194 | 31 |
| 11.3125 | 2543.32 | 255 | 2403.04 | 11.2306 | 0.0819 | 29 |
| 11.3750 | 2655.93 | 255 | 2403.04 | 11.2306 | 0.1444 | 27 |
| 11.4375 | 2773.52 | 255 | 2403.04 | 11.2306 | 0.2069 | 25 |
| 11.5000 | 2896.31 | 254 | 2836.24 | 11.4698 | 0.0302 | 31 |
| 11.5625 | 3024.54 | 254 | 2836.24 | 11.4698 | 0.0927 | 29 |
| 11.6250 | 3158.45 | 254 | 2836.24 | 11.4698 | 0.1552 | 27 |
| 11.6875 | 3298.28 | 254 | 2836.24 | 11.4698 | 0.2177 | 25 |
| 11.7500 | 3444.31 | 254 | 2836.24 | 11.4698 | 0.2802 | 23 |
| 11.8125 | 3596.80 | 253 | 3459.97 | 11.7565 | 0.0560 | 30 |
| 11.8750 | 3756.05 | 253 | 3459.97 | 11.7565 | 0.1185 | 28 |
| 11.9375 | 3922.34 | 253 | 3459.97 | 11.7565 | 0.1810 | 26 |
| 12.0000 | 4096.00 | 253 | 3459.97 | 11.7565 | 0.2435 | 24 |

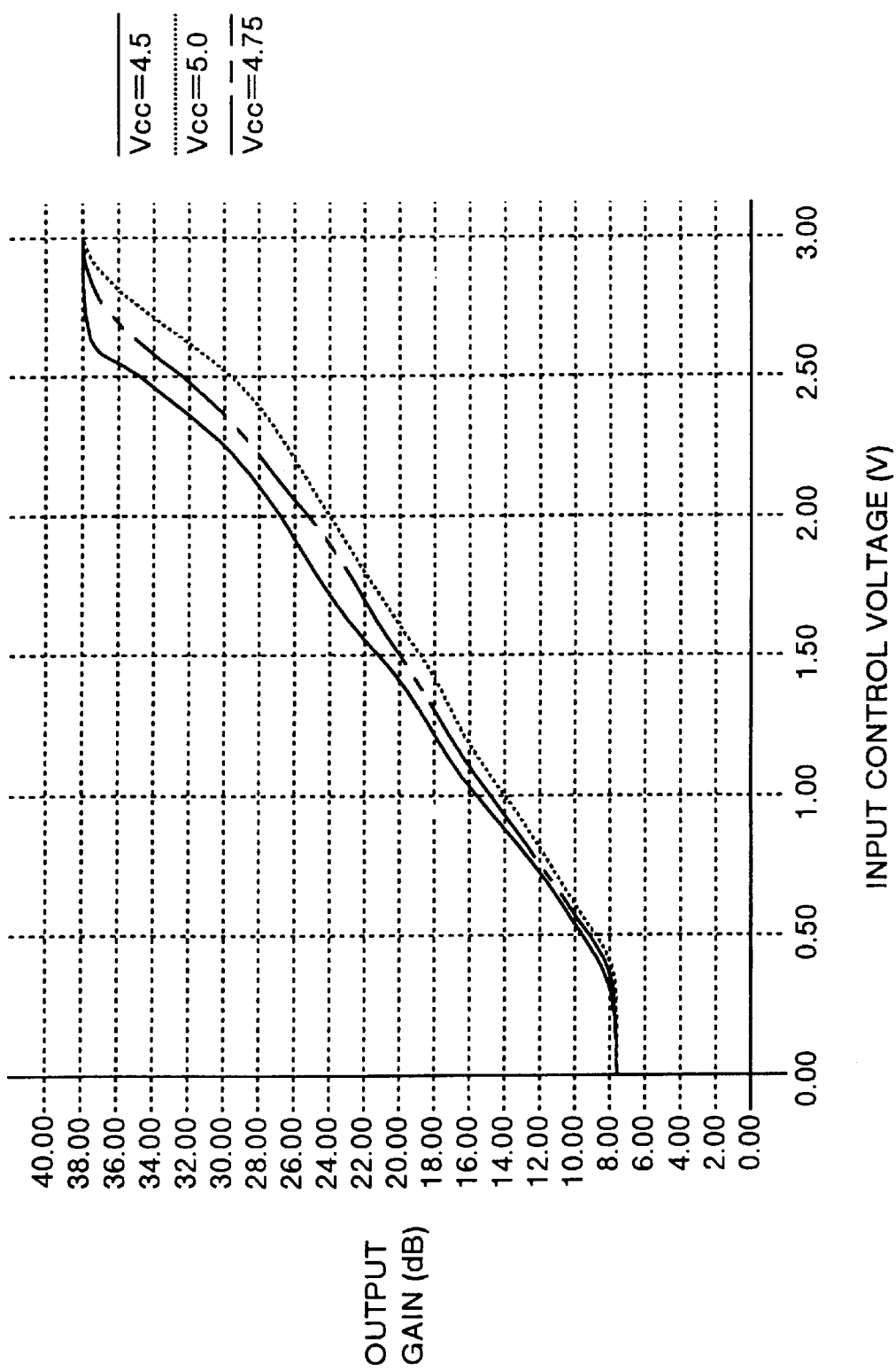

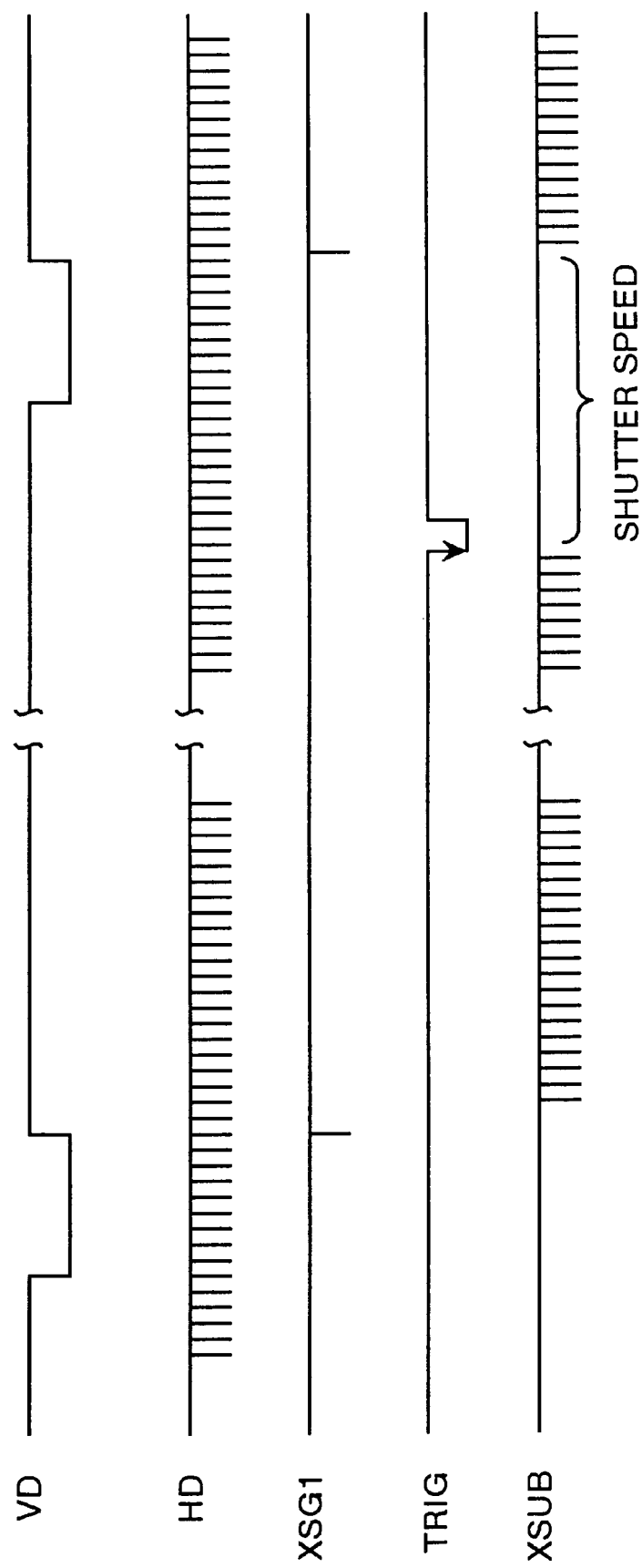

FIG.11A

HIGH-SPEED SHUTTER

| LOAD VALUES | SHUTTER SPEED | COMPUTED VALUES |
|---|---|---|
| FAH | 1/10000 | 1/10169 |
| FCH | 1/4000 | 1/4435 |
| 100H | 1/2000 | 1/2085 |
| 108H | 1/1000 | 1/1012 |
| 118H | 1/500 | 1/499 |
| 137H | 1/250 | 1/252 |
| 176H | 1/125 | 1/125 |
| 196H | 1/100 | 1/100 |

FIG.11B

LOW-SPEED SHUTTER

| LOAD VALUES | SHUTTER SPEED |
|---|---|
| FEH | 2 |
| FDH | 4 |
| ⋮ | ⋮ |
| 01H | 508 |
| 00H | 510 |

FIG.13

| TV | 1/T (S) | mS | DIFFERENCE | |
|---|---|---|---|---|
| 8.0000 | 256.00 | 3.9063 | 0.1656 | |
| 8.0625 | 267.33 | 3.7406 | 0.1586 | |
| 8.1250 | 279.17 | 3.5820 | 0.1519 | |
| 8.1875 | 291.53 | 3.4302 | 0.1454 | |
| 8.2500 | 304.44 | 3.2848 | 0.1393 | |
| 8.3125 | 317.92 | 3.1455 | 0.1334 | |
| 8.3750 | 331.99 | 3.0121 | 0.1277 | ★1/32TV |
| 8.4375 | 346.69 | 2.8844 | 0.1223 | |
| 8.5000 | 362.04 | 2.7621 | 0.1171 | |
| 8.5625 | 378.07 | 2.6450 | 0.1121 | |
| 8.6250 | 394.81 | 2.5329 | 0.1074 | |
| 8.6875 | 412.29 | 2.4255 | 0.1028 | |
| 8.7500 | 430.54 | 2.3227 | 0.0985 | |
| 8.8125 | 449.60 | 2.2242 | 0.0943 | |
| 8.8750 | 469.51 | 2.1299 | 0.0903 | |
| 8.9375 | 490.29 | 2.0396 | 0.0865 | |
| 9.0000 | 512.00 | 1.9531 | 0.0828 | |
| 9.0625 | 534.67 | 1.8703 | 0.0793 | |
| 9.1250 | 558.34 | 1.7910 | 0.0759 | |
| 9.1875 | 583.06 | 1.7151 | 0.0727 | |
| 9.2500 | 608.87 | 1.6424 | 0.0696 | |
| 9.3125 | 635.83 | 1.5727 | 0.0667 | |
| 9.3750 | 663.98 | 1.5061 | 0.0639 | ★1/16TV |
| 9.4375 | 693.38 | 1.4422 | 0.0611 | |
| 9.5000 | 724.08 | 1.3811 | 0.0586 | |
| 9.5625 | 756.13 | 1.3225 | 0.0561 | |
| 9.6250 | 789.61 | 1.2664 | 0.0537 | |
| 9.6875 | 824.57 | 1.2128 | 0.0514 | |
| 9.7500 | 861.08 | 1.1613 | 0.0492 | |
| 9.8125 | 899.20 | 1.1121 | 0.0471 | |
| 9.8750 | 939.01 | 1.0649 | 0.0452 | |
| 9.9375 | 980.59 | 1.0198 | 0.0432 | |
| 10.0000 | 1024.00 | 0.9766 | | |

FIG.14

| TV | 1/T (S) | mS | DEFFERENCE | |
|---|---|---|---|---|
| 10.0000 | 1024.00 | 0.9766 | 0.0414 | |
| 10.0625 | 1069.34 | 0.9352 | 0.0396 | |
| 10.1250 | 1116.68 | 0.8955 | 0.0380 | |
| 10.1875 | 1166.12 | 0.8575 | 0.0364 | |
| 10.2500 | 1217.75 | 0.8212 | 0.0348 | |
| 10.3125 | 1271.66 | 0.7864 | 0.0333 | |
| 10.3750 | 1327.96 | 0.7530 | 0.0319 | ★1/8TV |
| 10.4375 | 1386.76 | 0.7211 | 0.0306 | |
| 10.5000 | 1448.15 | 0.6905 | 0.0293 | |
| 10.5625 | 1512.27 | 0.6613 | 0.0280 | |
| 10.6250 | 1579.22 | 0.6332 | 0.0268 | |
| 10.6875 | 1649.14 | 0.6064 | 0.0257 | |
| 10.7500 | 1722.16 | 0.5807 | 0.0246 | |
| 10.8125 | 1798.40 | 0.5560 | 0.0236 | |
| 10.8750 | 1878.02 | 0.5325 | 0.0226 | |
| 10.9375 | 1961.17 | 0.5099 | 0.0216 | |
| 11.0000 | 2048.00 | 0.4883 | 0.0207 | |
| 11.0625 | 2138.67 | 0.4676 | 0.0198 | |
| 11.1250 | 2233.36 | 0.4478 | 0.0190 | |
| 11.1875 | 2332.24 | 0.4288 | 0.0182 | |
| 11.2500 | 2435.50 | 0.4106 | 0.0174 | |
| 11.3125 | 2543.32 | 0.3932 | 0.0167 | |
| 11.3750 | 2655.93 | 0.3765 | 0.0160 | ★1/4TV |
| 11.4375 | 2773.52 | 0.3606 | 0.0153 | |
| 11.5000 | 2896.31 | 0.3453 | 0.0146 | |
| 11.5625 | 3024.54 | 0.3306 | 0.0140 | |
| 11.6250 | 3158.45 | 0.3166 | 0.0134 | |
| 11.6875 | 3296.28 | 0.3032 | 0.0129 | |
| 11.7500 | 3444.31 | 0.2903 | 0.0123 | |
| 11.8125 | 3596.80 | 0.2780 | 0.0118 | |
| 11.8750 | 3756.05 | 0.2662 | 0.0113 | |
| 11.9375 | 3922.34 | 0.2549 | 0.0108 | |
| 12.0000 | 4096.00 | 0.2441 | | |

FIG.15

| TV | 1/T (S) | mS | DIFFERENCE | |
|---|---|---|---|---|
| 12.0000 | 4096.00 | 0.2441 | 0.0104 | |
| 12.0625 | 4277.35 | 0.2338 | 0.0099 | |
| 12.1250 | 4466.72 | 0.2239 | 0.0095 | |
| 12.1875 | 4664.48 | 0.2144 | 0.0091 | |
| 12.2500 | 4870.99 | 0.2053 | 0.0087 | |
| 12.3125 | 5086.65 | 0.1966 | 0.0083 | |
| 12.3750 | 5311.85 | 0.1883 | 0.0080 | ★1/2TV |
| 12.4375 | 5547.03 | 0.1803 | 0.0076 | |
| 12.5000 | 5792.62 | 0.1726 | 0.0073 | |
| 12.5625 | 6049.08 | 0.1653 | 0.0070 | |
| 12.6250 | 6316.90 | 0.1583 | 0.0067 | |
| 12.6875 | 6596.57 | 0.1516 | 0.0064 | |
| 12.7500 | 6888.62 | 0.1452 | 0.0062 | |
| 12.8125 | 7193.61 | 0.1390 | 0.0059 | |
| 12.8750 | 7512.10 | 0.1331 | 0.0056 | |
| 12.9375 | 7844.69 | 0.1275 | 0.0054 | |
| 13.0000 | 8192.00 | 0.1221 | 0.0052 | |
| 13.0625 | 8554.69 | 0.1169 | 0.0050 | |
| 13.1250 | 8933.44 | 0.1119 | 0.0047 | |
| 13.1875 | 9328.96 | 0.1072 | 0.0045 | |
| 13.2500 | 9741.98 | 0.1026 | 0.0044 | |
| 13.3125 | 10173.30 | 0.0983 | 0.0042 | |
| 13.3750 | 10623.71 | 0.0941 | 0.0040 | ★1TV |
| 13.4375 | 11094.06 | 0.0901 | 0.0038 | |
| 13.5000 | 11585.24 | 0.0863 | 0.0037 | |
| 13.5625 | 12098.16 | 0.0827 | 0.0035 | |
| 13.6250 | 12633.79 | 0.0792 | 0.0034 | |
| 13.6875 | 13193.14 | 0.0758 | 0.0032 | |
| 13.7500 | 13777.25 | 0.0726 | 0.0031 | |
| 13.8125 | 14387.22 | 0.0695 | 0.0029 | |
| 13.8750 | 15024.19 | 0.0666 | 0.0028 | |
| 13.9375 | 15689.37 | 0.0637 | 0.0027 | |
| 14.0000 | 16384.00 | 0.0610 | | |

DIGITAL CAMERA WITH VARIABLE GAIN TO OFFSET EXPOSURE ERROR

FIELD OF THE INVENTION

The present invention relates to a digital camera, and more particularly to a digital camera which enables a wide and correct exposure control only with an electronic shutter by offsetting a quantization error or an exposure error generated when a shutter speed is set by a pulse unit for sweeping away an electric charge in a CCD by controlling a gain in a variable gain amplifier.

BACKGROUND OF THE INVENTION

As a conventional type of digital camera, there has been disclosed, for instance, in Japanese Patent Laid-Open Publication No. HEI 2-60378 with the title of "Imaging Apparatus" (First Example of Conventional Technology), an imaging apparatus with improved convenience in use realized by controlling a diaphragm, a shutter speed of an imaging unit and the gain in the variable gain amplifier according to a signal level of an output signal from or an input signal to the variable gain amplifying circuit.

Also disclosed in Japanese Patent Laid-Open Publication No. HEI 1-288070 with the title of "Electronic Imaging Apparatus" (Second example of conventional technology) is an apparatus which controls a gain relating to optoelectronic conversion output from an imaging unit dependent on an exposure rate according to a gain control signal given by a gain control unit, obtains a signal indicating a value corresponding to a shortage of the actual exposure rate from a specified exposure rate as a gain control signal, supplies said gain control signal to said control unit, and continues an imaging operation at a continuously imaging speed set at the point of time with a unit for preserving an operation mode with preference in a continuously imaging speed even under conditions or in a region outside the optimal exposure conditions.

In the second example of conventional technology described above, a shuttering second time (a continuously imaging speed in the continuously imaging mode) set by a photographer can be maintained, and in a case where exposure is short in the continuously imaging mode, the shortage in exposure is compensated by gain control for an image signal, whereby it becomes possible to obtain an image with an optimal quantity of light.

However, in the conventional type of digital cameras as described above, a speed of an electronic shutter can be set only by a pulse XSUB unit for sweeping away an electric charge in a CCD sensor, and for this reason as the shutter speed is set to a higher value, displacement of the actual shutter speed from a theoretical value (quantization error) becomes larger. Detailed description is made below for this phenomenon.

FIG. 9 shows configuration of a representative camera based on the conventional technology. In this figure, the digital camera based on the conventional technology comprises a lens 401, a mechanism 402 including an auto-focus or the like, a CCD 403, CDS circuit 404, an A/D converter 406, an IPP 107, a DCT 108, a coder 109, an MCC 110, a RAM (internal memory) 111, a PC card interface 112, a CPU 421 incorporating a ROM table 421a, a display section 122, an operating section 123, a transfer section 124, a motor driver 425, and an SG (signal generating) section 426. Also a dismountable PC card 150 is connected thereto via the PC card interface 112.

The lens unit comprises the lens 401, the mechanism 402 including an auto-focus (AF)/diaphragm/filter section, and a mechanical shutter in the mechanism 402 simultaneously executes exposure of two fields. The CCD (charge coupled device) 403 converts an image inputted thereto via a lens unit to an electric signal (analog image data). The CDS (correlated double sampling) circuit 404 is a circuit for reducing noises in a CCD type of imaging element. The A/D converter 406 converts analog image data inputted via the CDS circuit 404 from the CCD 403 to digital image data. Namely, an output signal from the CCD 403 is converted to a digital signal at an optimal sampling frequency (for instance, an integer number times larger than a subcarrier frequency of an NTSC signal) by the A/D converter 406.

Also the IPP (Image Pre-Processor) 107 which is a digital signal processing section, the DCT (Discrete Cosine Transform) 108, and the coder (Huffman Encoder/Decoder) 109 divide digital image data inputted from the A/D converter 406 to several portions according to a color difference (Cb, Cr) and brightness (Y), and subject the portions to various types of processing for correcting, compressing or expanding the image. The image compressing/expanding section 107 executes such processing as, for instance, orthogonal transformation or Huffman encoding/decoding, each of which is one step of image compression/expansion based on JPEG standard.

Further, the MCC (Memory Card Controller) 110 stores a compressed image once and records the image via the PC card interface 112 into the PC card 150 or reads out the image from the PC card 150.

Herein controls for operations of the electronic shutter are provided upon input of a control signal con 41 from the CPU 421 according to a control signal group c41 supplied to the CCD 403 by the SG (control signal generating) section 426. FIG. 10 is a timing chart for each of a vertical synchronizing signal VD, a horizontal synchronizing signal HD, a CCD electric charge read pulse XSG1, a continuously variable shutter control signal TRIG, and a CCD electric charge sweep-away pulse XSUB, each of which is included in the control signal group c41.

Also FIG. 10 is a view for illustrating controls over a shutter speed according to the continuously variable shutter control signal TRIG. Namely, when the shutter is operated in he ordinary mode, a terminal for the continuously variable shatter control signal TRIG is set to open or a potential of a power supply unit, but in a case where the shutter is operated in the continuously variable mode, a clock pulse is inputted into the terminal for the continuously variable shutter control signal TRIG.

Namely, the shutter speed is decided by removing a pulse for the CCD electric charge sweep-away pulse XSUB within a time frame of a lagging edge of the CCD electric charge read pulse XSG1 as well as of the continuously variable shutter control signal TRIG and stopping the pulse for the CCD electric charge sweep-away pulse XSUB within a time frame between a lagging edge of the continuously variable shutter control signal TRIG and the next CCD electric charge read pulse XSG1. It should be noted that, in a case where the shutter speed is controlled according to the continuously variable shutter control signal TRIG as described above, a preset value for the shutter speed according to a shutter speed control signal described hereinafter must be set to $1/10000$ to broaden the control range.

For the reasons as described above, it is understood that speed setting for an electric shutter can be made only by a unit of CCD sensor electric charge sweep-away pulse XSUB.

Next description is made for control over a shutter speed according to a shutter mode select signal and a shutter speed control signal. At first, upon input of a shutter mode select signal, in the NTSC system, the operation mode is set to any of the high-speed shutter mode in which the shutter speed is faster than 1/60 sec, a low-speed shutter mode in which the shutter speed is slower than 1/60 sec, or a no-shutter mode in which a shuttering operation is not executed.

Then in the high-speed shutter mode or in the low-speed shutter mode, a shutter speed is computed according to the shutter speed control signal. Namely, as shown in FIGS. 11A and 11B, in the NTSC system, a load value is read out from the ROM table 421a incorporated in the CPU 421 for each of the high-speed shutter mode (Refer to FIG. 11A) and low-speed shutter mode (Refer to FIG. 11B), and the shutter speed is computed. Namely, if the load value is set to IPP 107, exposure is executed according to the computed shutter speed.

Assuming that LH is a load value, in a case of the high-speed shutter mode, the shutter speed is computed through the following expression:

$$T=(262D-(1FFH-LH)\times 63.56+34.78[\mu s]$$

The representative shutter speed obtained through this expression is shown in the chart in FIG. 11A. It should be noted that a figure without any attended character and D as an attended character to a figure indicate a decimal number, and "H" as an attended character to an alphanumerical character indicates a hexadecimal number. With this, in a case of the NTSC system, it is understood that a unit of a shutter speed is 63.56 [$\mu s$].

Also in a case of the low-speed shutter mode, the shutter speed is computed through the expression of N=2×(FFH−LH) [FLD]. Herein 1 [FLD] indicates 1/60 second, and a product of the FLD value by 1/60 second becomes the specified shutter speed.

Further FIG. 12 shows an example of EV diagram. Herein the EV diagram is a view showing a combination of an aperture value AV (Aperture Value) and a time value TV (Time Value) for achieving a desired exposure value EV (Exposure Value), and there is a relation of EV=AV+TV among the exposure value EV, aperture value AV, and time value TV in the exposure adjustment. A light value Lv (Light Value) is a value obtained by measuring intensity of light, and there is a relation of EV=Lv under appropriate exposure. It should be noted that 1/T is equal to TV-th power of 2, and a square of FNo. is equal to an AV-th power of 2.

In the example of EV diagram shown in FIG. 12, the F value can be set only to either F2 or F8, and for switching it, F2 is selected in a range up to Lv12, and F8 is selected in a faster beyond Lv12. Further, as only F2 and F8 are available for selecting the F value, a desired exposure rate is obtained by changing the shutter speed by a unit of 1/16 TV.

Next description is made for a quantization error in a shutter speed. Charts shown in FIG. 13, FIG. 14 and FIG. 15 are views for illustrating a change of a value against each TV value obtained by a unit of 1/16 TV. Herein the term of the difference (mS) indicates a value obtained by subtracting a time (mS) for the subsequent value from a value for the current value.

Namely, FIG. 13, FIG. 14, and FIG. 15 show how the CCD sensor electric charge sweep-away pulse XSUB unit (63.56 [$\mu s$]) affects the exposure. In the figures, the section with ★ indicates the effect, and for instance, the difference between a shutter speed when the VT value is 9.375 and that when the shutter speed is 9.4375 is 0.0639 [mS]=63.9 [$\mu S$]. For this reason, a change rate for the shutter speed required to change the TV value by 1/16 when the TV value is around 9.375 is 63.9 [$\mu S$], which is around 1 XSUB, and from this it is understood that the TV value may be changed by 1/16 for a change of 1 XSUB.

This is a quantization error due to the CCD sensor electric charge sweep-away pulse XSUB, and summarizing from FIG. 13, FIG. 14, and FIG. 15, influence of 1 XSUB to exposure is as shown below.

| TV | Difference in shutter speed (ΔTV = 1/16) | Round number by XSUB unit (63.56 μS) | Round number for ΔTV/XSUB |
|---|---|---|---|
| 8.375 | 127.7 | 2 | 1/32 |
| 9.375 | 63.9 | 1 | 1/16 |
| 10.375 | 31.5 | 0.5 | 1/8 |
| 11.375 | 16.0 | 0.25 | 1/4 |
| 12.375 | 8.0 | 0.125 | 1/2 |
| 13.375 | 4.0 | 0.063 | 1 |

Thus, it is understood that the higher the shutter speed is, the larger a quantization error is.

As described above, in the conventional technology, an operating speed of the electronic shutter can be made only by the CCD sensor electric charge sweep-away pulse XSUB, so that, as a shutter speed is set to a higher value, displacement of the actual shutter speed from the theoretical value (quantization error) becomes larger.

Further, if a diaphragm (iris) can be set without step, the quantization error can be offset by controlling the diaphragm (iris), but in a case where, for instance, the diaphragm (iris) can be set only step by step (as shown in FIG. 12) due to restrictions in system designing for the apparatus or to requirements for cost reduction in the apparatus, the quantization error becomes an exposure error, and when the shutter speed become higher, it may becomes disadvantageously unignorable.

SUMMARY OF THE INVENTION

It is an object of the present invention to provide a digital camera which enables appropriate exposure control in a broad range only with an electronic shutter by offsetting with gain control a quantization error or an exposure error generated when the shutter speed is set by a CCD electric charge sweep-away pulse unit.

With the digital camera according to the present invention, when a signal level of an image signal for a CCD is corrected with a variable gain amplifier, a gain for the variable amplifier is controlled by a control unit so that a quantization error or an exposure error generated when the shutter speed is set by a unit of CCD electric charge sweep-away pulse will be offset, so that , even in a case where the diaphragm can be set only step by step due to restrictions in system designing for an apparatus, or because of requirements for cost reduction in the apparatus, an exposure error can be reduced even when the shutter speed becomes higher, whereby it is possible to provide a digital camera which can execute appropriate exposure control only with an electronic shutter.

With the digital camera according to the invention, the control unit controls a gain for a variable gain amplifier so that, of quantization errors, a quantization error generated when a shutter speed is set to the high-speed side will be offset, so that it is possible to provide a digital camera which can use, in gain control for the variable gain amplifier, a section having linearity in a gain against a setup value, and is advantageous for system designing with the same control form as that in gain control for the variable gain amplifier performed in imaging under low illuminance.

With the digital camera according to the invention, the control unit generates a signal for gain control for a variable gain amplifier by referring to a shutter speed set for a time value (TV) in exposure adjustment as well a to a data table in which a quantization error then is stored in a tabular form, so that complicated computing is not required with computing load to the control unit reduced, also the processing can be executed at a higher speed, and further appropriate exposure control can be made without repeating measurement of light with a CCD when a gain for the variable gain amplifier is changed by offsetting the quantization error; whereby it is possible to provide a digital camera which can generally execute required operations at a higher speed.

With the digital camera, when a signal level of an image signal for a CCD is corrected with a digital gain adjusting unit, the control unit controls a gain for the digital gain adjusting unit so that a quantization error or an exposure error generated when a shutter speed is set by a unit of CCD electric charge sweep-away pulse (included in a control signal group c1) will be offset, so that an exposure error can be reduced when a shutter speed becomes higher even in a case where the diaphragm can be set only step by step due to restrictions in system designing for an apparatus or because of requirements for cost reduction in the apparatus; whereby it is possible to provide a digital camera which can execute appropriate exposure control in a broad range only with an electronic shutter. Also the digital gain adjusting unit can execute gain adjustment in a broad range, so that it is possible to correct a signal level of an image signal in a broad range.

With the digital camera according to the invention, the digital gain adjusting unit comprises multipliers provided for R, G, and B, and a signal level of an image signal is adjusted by multiplying image signals for R, G and B inputted to the multipliers by the gain data computed by the control unit; whereby it is possible to provide a digital camera which can digitally correct a signal level of an inputted image signal with simple configuration.

With the digital camera according to the invention; when a signal level of an image signal for a CCD is corrected with a variable gain amplifier and/or a digital gain adjusting unit, a gain for the variable gain amplifier and/or the digital gain adjusting unit is controlled by the control unit so that a quantization error or an exposure error generated when the shutter speed is set by a unit of CCD electric charge sweep-away pulse (included in the control signal group c1) will be offset, so that, even in a case where the diaphragm can be set only step by step due to restrictions in system designing for an apparatus or because of requirements for cost reduction in the apparatus, an exposure error can be reduced even when the shutter speed becomes higher; whereby it is possible to provide a digital camera which can execute exposure control in a broad range with an electronic shutter. Also it becomes possible to execute gain adjustment in a broad range, so that it becomes possible to correct a signal level of an image signal in a broad range.

With the digital camera according to the invention, the control unit controls a gain for a variable gain amplifier so that, of quantization errors, a quantization error generated when the shutter speed is set to the high-speed side will be offset, and also the control unit controls a gain for the digital gain adjusting unit so that, of the quantization errors, a quantization error generated when the shutter speed is set to the lower speed side will be offset, so that a section having linearity in a gain against a setup value can be used in gain control for the variable gain amplifier, and also gain adjustment can be executed by the digital gain adjusting unit for a section having no linearity in a gain for the variable gain amplifier, so that gain adjustment can be executed in a broad range, whereby it is possible to provide a digital camera which can correct a signal level of an image signal in a broad range.

Other objects and features of this invention will become understood from the following description with reference to the accompanying drawings.

BRIEF DESCRIPTION OF THE DRAWINGS

FIG. 3 is a chart showing contents of a ROM table incorporated in the CPU shown in FIG. 1 (Case 1);

FIG. 4 is a chart showing contents of a ROM table incorporated in the CPU shown in FIG. 1 (Case 2);

FIG. 7 is an explanatory view showing a relation between an input control voltage (V) and an output gain (dB) in an AGC amplifier according to Embodiment 3 of the present invention;

FIG. 10 is an explanatory view showing control over a shutter speed according to a continuously variable shutter control signal;

FIGS. 11A and 11B are explanatory views for a ROM table incorporated in the CPU, and FIG. 11A shows the high-speed shutter mode, while FIG. 11B shows the low-speed shutter mode;

FIG. 13 is an explanatory view for illustrating change of a value against each TV value obtained by a unit of 1/16 TV (Case 1);

FIG. 14 is an explanatory view for illustrating change of a value against each TV value obtained by a unit of 1/16 TV (Case 2); and FIG. 15 is an explanatory view for illustrating change of a value against each TV value obtained by a unit of 1/16 TV (Case 3).

DESCRIPTION OF THE PREFERRED EMBODIMENTS

Next description is made for outline of the digital camera according to the present invention as well as for embodiments of the digital camera according to the present invention with reference to the related drawings.

Figure 1:
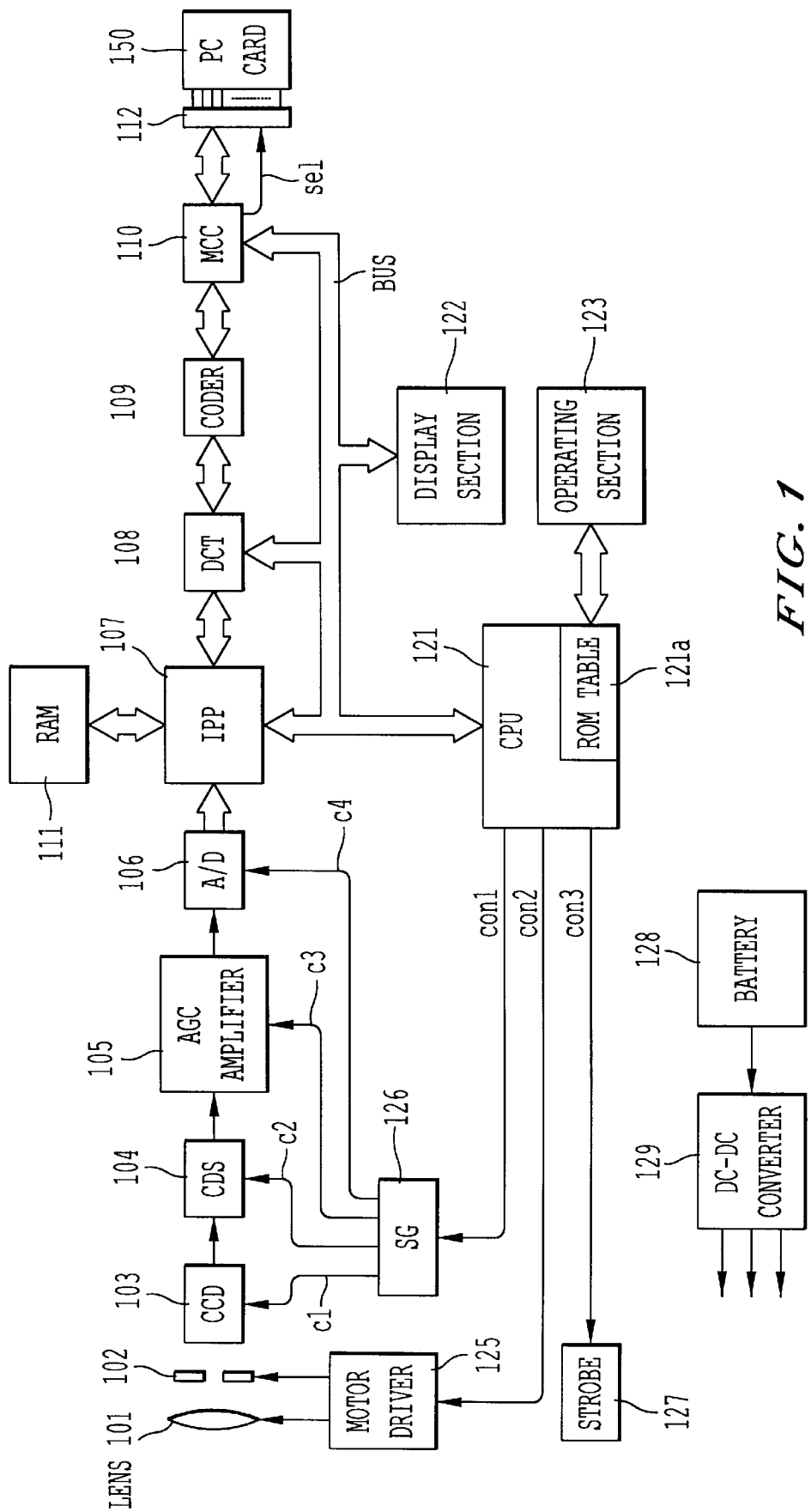
FIG. 1 is a block diagram showing general configuration of a digital camera according to Embodiment 1 of the present invention.

In the digital camera according to the present invention, as shown in FIG. 1, when correcting a signal level of an image signal for the CCD 103 with the variable gain amplifier 105, a gain in the variable gain amplifier 105 is controlled by the control unit 121 and 126 so that a quantization error or an exposure error generated when a shutter speed is set by a CCD electric charge sweep-away pulse (included in the control signal group c1) will be offset.

With this, in a case where a diaphragm (iris) can be set only step by step due to restrictions in system designing for the apparatus or requirements for cost reduction, an exposure error can be reduced even at a high shutter speed, which enables an appropriate exposure control in a broad range only with an electronic shutter.

In the digital camera according to the invention, the control unit 121 and 126 control a gain in the variable gain amplifier 105 so that, of quantization errors, a quantization error generated when the shutter speed is set to the high-speed side will be offset. Namely, the control is provided so that, of the shutter speeds which can be set, a shutter speed higher than a theoretical shutter speed, which is close to the theoretical shutter speed, is set to offset a generated quantization error.

Generally in gain control for the variable gain amplifier 105, if an initial value is set to a value insuring an excellent image, linearity of gain to a setup value in a direction in which the gain is lowered is not provided, so that, when the shutter speed is set as described above, a quantization error is set to the high-speed side of the shutter speed to execute correction with a higher gain.

With this feature, in gain control for the variable gain amplifier 105, a section having linearity of a gain against a setup value can be used, and the control form is like that in gain control for the variable gain amplifier 105 in imaging under low illuminance, which is advantageous for system designing.

Further, in the digital camera, the control unit 121 and 126 generate a signal for gain control over the variable gain amplifier 105 by referring to a data table 121a which stores therein a shutter speed set for a time value (TV) in exposure adjustment and a quantization error in the step.

With this, a load for computing to the control unit is reduced because complicated computing is not required, and the processing is executed at a higher speed. Also, in a case where there is not provided the data table 121a, it is necessary to require until an appropriate exposure rate is obtained light measurement with the CCD 103 when a gain in the variable gain amplifier 105 is changed, but also this operation is not necessary and appropriate exposure control can be executed by offsetting a quantization error, and also the processing for operations of the entire system can be made at a higher speed.

Figure 5:
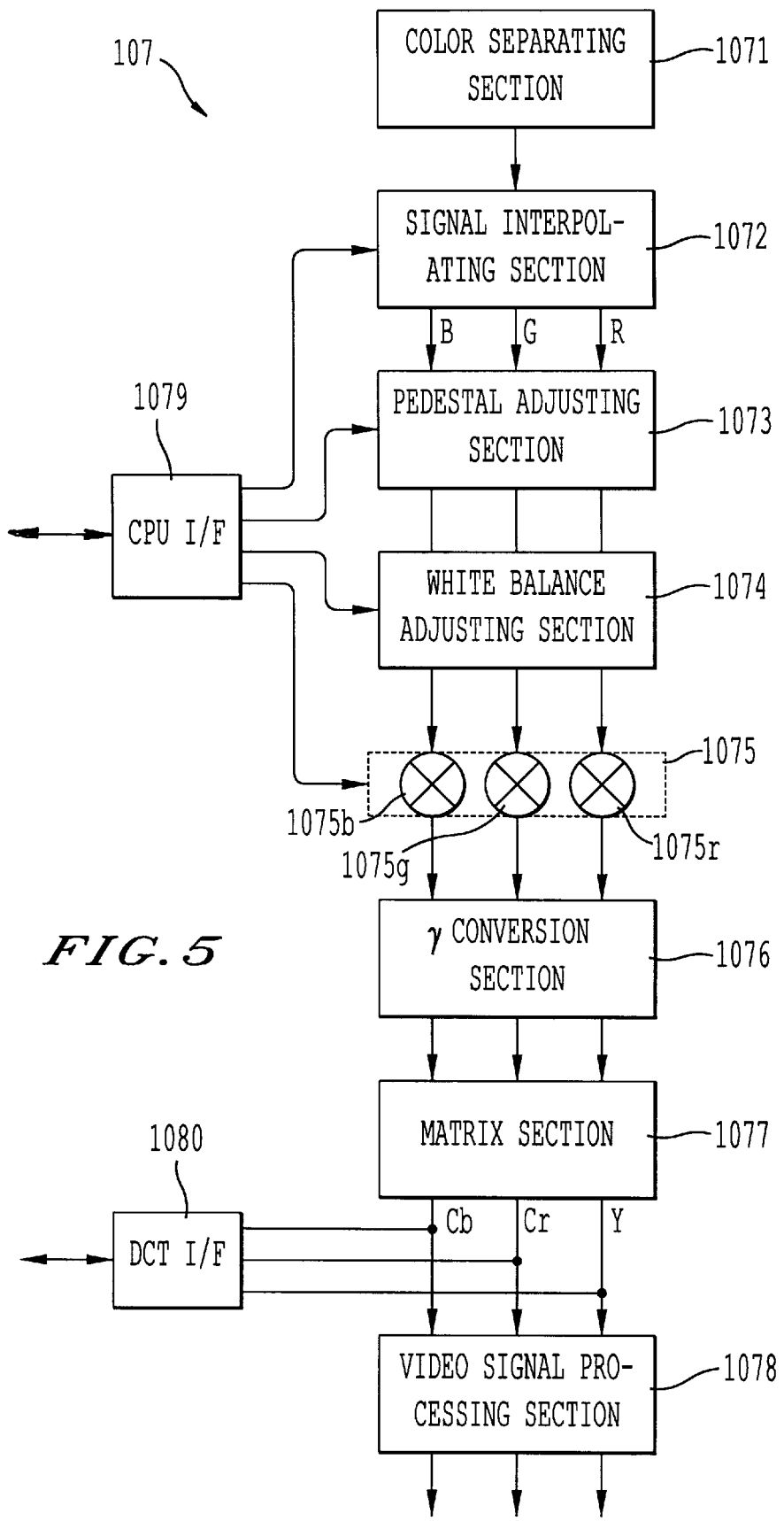
FIG. 5 is a block diagram showing detailed configuration of an IPP according to Embodiment 2 of the present invention.

In the digital camera according to the invention, as shown in FIG. 1 and FIG. 5, when a signal level of an image signal for the CCD 103 is corrected by the digital gain adjusting unit 1075, a gain in the digital gain adjusting unit 1075 is controlled by the control unit 121 so that a quantization error or an exposure error generated when the shutter speed is set by a CCD electric charge sweep-away pulse unit (included in the control signal group c1).

With this feature, in a case where a diaphragm (iris) can be set only step by step due to restrictions in system designing for the apparatus or requirements for cost reduction, an exposure error can be reduced even if the shutter speed becomes higher, and also appropriate exposure control can be executed in a broad range only with an electronic shutter. Also the digital gain adjusting unit 1075 allows gain control in a broad range, so that it becomes possible to correct a signal level of an image signal in a broad range.

In the digital camera according to the invention, the digital gain adjusting unit 1075 comprises multipliers 1075r, 1075g, and 1075b provided for each of R, B, and G, and a signal level of an image signal is adjusted by multiplying image signals for RGB inputted to the multipliers 1075r, 1075g, 1075b by gain data computed with the control unit 121.

With this feature, a signal level of an inputted image signal can digitally be corrected with simple configuration.

In the digital camera, as shown in FIG. 1 and FIG. 5, when a signal level of an image signal for the CCD 103 is corrected by the variable gain amplifier 105 and/or the digital gain adjusting unit 1075, a gain in the variable gain amplifier 105 and/or digital gain adjusting unit 1075 is controlled by the control unit 121 and 126 so that a quantization error or an exposure error generated when the shutter speed is set by a CCD electric charge sweep-away pulse (included in the signal group c1) will be offset.

With this feature, in a case where a diaphragm can be set only step by step due to restrictions in system designing for an apparatus or because of requirements of cost reduction for the apparatus, an exposure error can be reduced even if the shutter speed becomes higher, and exposure control can be executed in a broad range only with an electronic shutter. Also it is possible to execute gain control in a broad range, it is possible to correct a signal level of an image signal in a broad range.

In a digital camera according to the present invention, the control unit 121 and 126 control a gain in the variable gain amplifier 105 so that, of quantization errors, a quantization error generated when the shutter speed is set to a high-speed side will be offset, while the control unit 121 controls a gain in the digital gain adjusting unit so that, of the quantization errors, a quantization error generated when the shutter speed is set to the lower speed side will be offset.

Namely, when, of selectable shutter speeds, a shutter speed close to the theoretical shutter speed and at the same time in the higher speed side is selected, a gain in the variable gain amplifier 105 is controlled, while, when, of selectable shutter speeds, a shutter speed close to the theoretical shutter speed and at the same time in the lower speed side is selected, a gain in the digital gain adjusting unit 1075 is controlled to offset a generated quantization error.

Generally, in gain control for the variable gain amplifier 105, when an initial value is set to a value insuring an excellent image, as linearity of a gain against a setup value is not insured in a direction in which a gain is lowered (a direction in which a gain is minus), so that, in the variable gain amplifier 105, in a case where a quantization error is set to a higher speed side of the shutter speed, a signal level of an image signal is corrected by raising the gain (assuming that the gain is pulse). On the other hand, in gain control for the digital gain adjusting unit 1075, a gain adjustment can be executed in a broad range (in a direction in which a gain is minus and in a direction where a gain is pulse), so that, in a case where a quantization error is set to a lower speed side of the shutter speed, a signal level of an image signal is corrected by lowering the gain (assuming that the gain is minus).

With this, in gain control for the variable gain amplifier 105, a section having linearity of a gain against a setup value for the variable gain amplifier 105 (in a direction where a gain is pulse) is used, as for a range where there is no linearity of a gain for the variable gain amplifier 105 (in a direction where a gain is minus), gain adjustment is executed by the digital gain adjusting unit 1075, so that gain adjustment can be executed in a broad range, and a signal level of an image signal can be corrected in a broad range.

FIG. 1 is a block diagram showing a digital camera according to one embodiment (Embodiment 1) of the present invention.

In this figure, the digital camera according to this embodiment comprises a lens 101, a mechanism 102 including an auto-focus or the like, a CCD 103, a CDS circuit 104, a variable gain amplifier (AGC amplifier) 105, an A/D converter 106, an IPP 107, a DCT 108, a coder 109, an MCC 110, a RAM (internal memory) 111, a PC card interface 112, a CPU 121 incorporating a ROM table 121a, a display section 122, an operating section 123, a motor driver 125, and an SG (control signal generating) section 126, a strobe 127, a battery 128, and a DC—DC converter 129. Also a dismountable PC card 150 is connected thereto via the PC card interface 112.

The lens unit comprises the lens 101, the mechanism including an auto-focus (AF)/diaphragm/filter section or the like, and a mechanical shutter in the mechanism 102 executes simultaneous exposure to two fields. The CCD (charge coupled device) 103 converts an image inputted via the lens unit to an electric signal (analog image data). The CDS (correlated double sampling) circuit 104 is a circuit for reducing noises in a CCD type of imaging element.

Also the AGC amplifier 105 corrects a level of a signal subjected to correlated double sampling in the CDS circuit 104. Further the A/D converter 106 converts analog image data inputted via the AGC amplifier 105 from the CCD 103 to digital image data. Namely, an output signal from the CCD 103 is converted to digital signal via the CDS circuit 104 and AGC amplifier 105 and also by the A/D converter 105 at an optimal sampling frequency (for instance, an integer number larger than a subcarrier frequency of an NTSC signal).

Also the IPP (Image Pre-Processor) 107 which is a digital signal processing section, the DCT (Discrete Cosine Transform) 108, and the coder (Huffman Encoder/Decoder) 109 divides digital image data inputted from the A/D converter 106 to several portions according to a color difference (Cb, Cr) and brightness (Y), and subject the portions to various types of processing for correcting, compressing or expanding the image. The image compressing/expanding section 107 executes such processing as, for instance, orthogonal transformation or Huffman encoding/decoding, each of which is one step of image compression/expansion based on JOEG standard.

Further, the MCC (Memory Card Controller) 110 stores a compressed image once and records the image via the PC card interface 112 into the PC card 150 or reads out the image from the PC card 150.

The CPU 121 controls all operations inside the digital camera according to instructions from the operating section 123 or according to external operating instructions from a remote controller or the like now shown herein. Also power for the camera is inputted from, for instance, a NiCd, nickel hydrogen, or lithium battery or the like into the DC—DC converter 129 and supplied into the inside of the digital camera.

The display section 122 is realized with an LCD, an LED, an EL or the like, and displays imaged digital data, or recorded image data having been subjected to processing for expansion, and a state of the digital camera or other data is displayed on a display screen in the mode display section. The operating section 123 has buttons for setting various types of operation mode such as function selection, or instruction for imaging from the outside.

Herein control over operations of the electronic shutter are executed upon input of a control signal con1 from the CPU 121 according to a control signal group c1 supplied from the SG (control signal generating) section 126 to the CCD 103. The control signal group c1 includes, like in the conventional technology, a vertical synchronizing signal VD, a horizontal synchronizing signal HD, a CCD electric charge read pulse XSG1, a continuously variable shutter control signal TRIG, a CCD electric charge sweep-away pulse XSUB, a shutter mode select signal, and a shutter speed control signal, and basic operations according to the signals are also the same as those in the conventional technology (Refer to FIG. 10 and FIGS. 11A and 11B).

For the reasons as described above, also in this embodiment, an operating speed of the electronic shutter is set by a unit of CCD sensor CCD electric charge sweep-away pulse XSUB like in the conventional technology.

Figure 12:
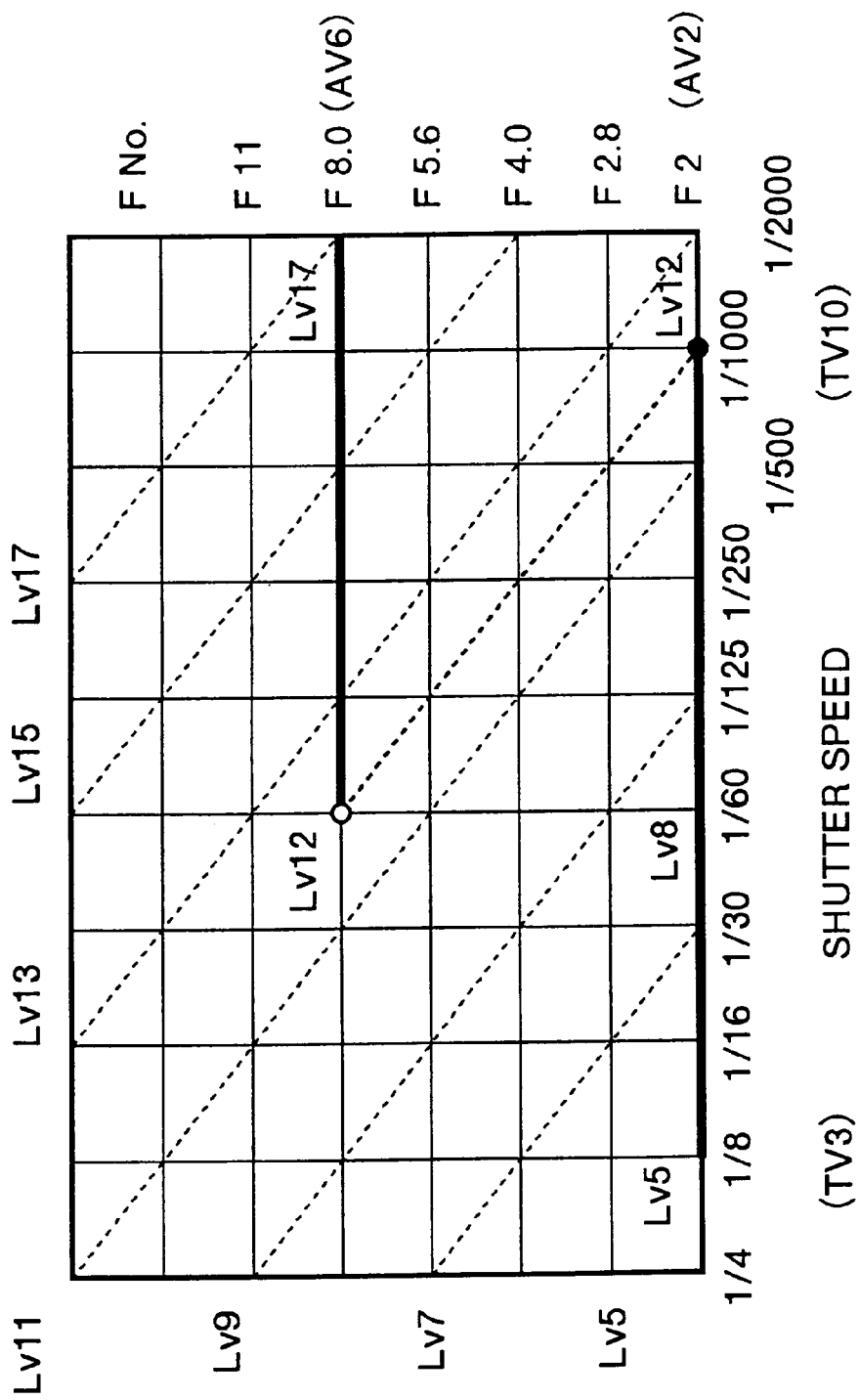
FIG. 12 is an explanatory view showing an example of EV diagram.

Also in this embodiment, because of restrictions in system designing for an apparatus or requirements for cost reduction in the apparatus, the diaphragm may be set only step by step. Namely, in this case, for the EV diagram, like in the conventional technology, and also as shown in FIG. 12, only either one of F2 or F8 can be selected as an F value, and as for switching of the value, F2 is selected in a range up to Lv12, and F8 is selected in a range from Lv12 and on respectively.

Next description is made for gain control for the AGC amplifier, which is one of the features of this embodiment. Namely, in this embodiment, when a signal level of an image signal for the CCD 103 is corrected by the AGC amplifier, a gain in the AGC amplifier 105 is controlled by the CPU 121 and SG section 126 so that a quantization error or an exposure error generated when the shutter speed is set by a unit of CCD electric charge sweep-away pulse XSUB will be offset.

Figure 2:
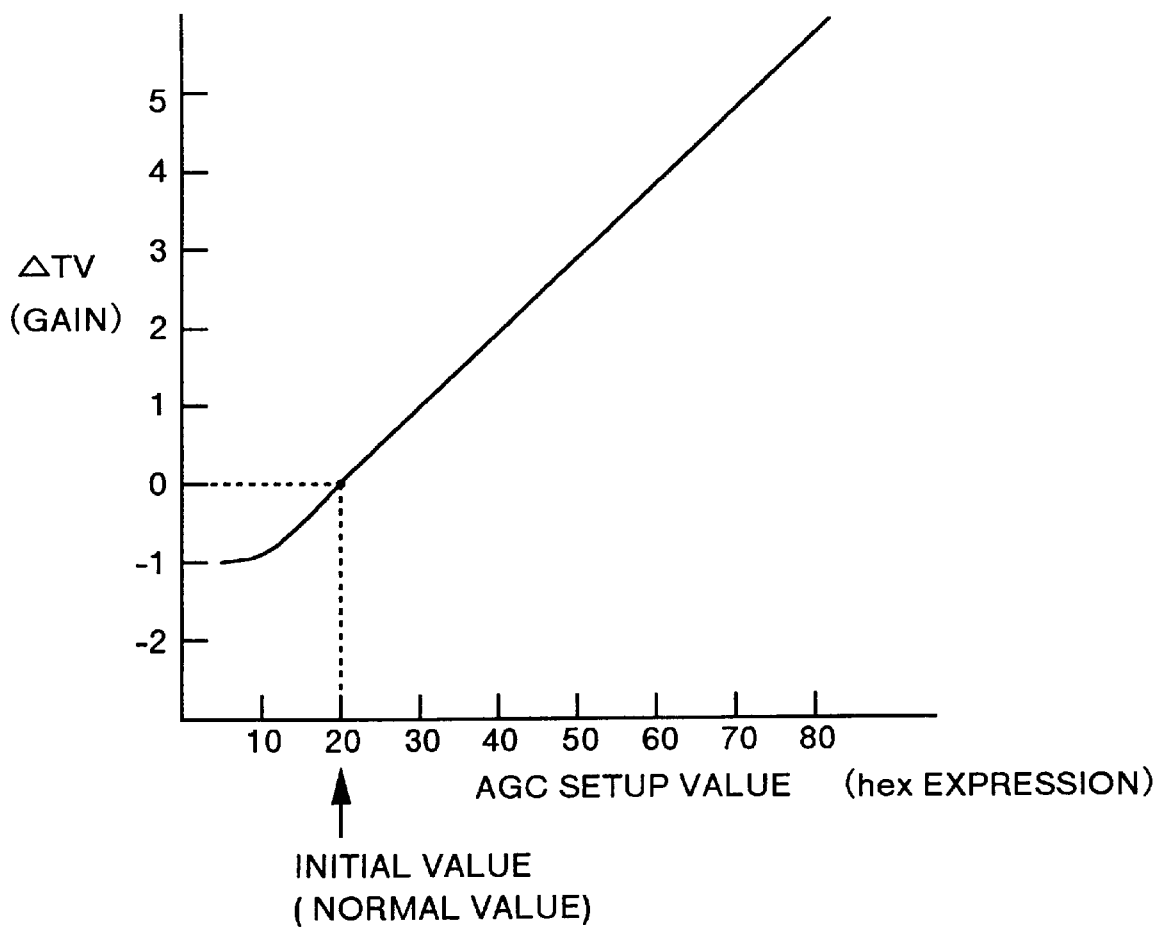
FIG. 2 is an explanatory view for illustrating a relation between a setup value for a gain in an AGC amplifier and a quantization error in Embodiment 1.

FIG. 2 is a view illustrating a relation between a gain a setup value in the AGC amplifier 105 and a quantization error in this embodiment. FIG. 3 is a chart showing one example of contents of the ROM table 121a incorporated in the CPU 121. In the figure, 301 shows a TV value and a 1/T value based on theoretical values respectively, 302 shows a TV value and a 1/T value based on load values respectively, and 303 shows $\Delta TV$ and AGC setup value (expressed with decimal numbers).

The ROM table 121a is a data table which stores therein a shutter speed set against a time value (TV) in exposure adjustment and a quantization error in this step. Especially the data table shown in FIG. 3 is set in a direction in which a quantization error $\Delta TV$ is minus, and an AGC setup value assuming a pulse gain is set to offset this minus quantization error $\Delta TV$.

In FIG. 3, TV indicates a time value, 1/T indicates a shutter speed, a load value indicates a shutter speed which the CPU 121 sets in the IPP 107, $\Delta TV$ indicates a difference between TV based on a theoretical value and that based on a load value, and AGC is a gain value to be set in the AGC amplifier 105 obtained from the $\Delta TV$ through the relation shown in FIG. 2.

The $\Delta TV$ in FIG. 3 indicates a quantization error generated as a difference between TV based on a theoretical value and that based on a load value, and the $\Delta TV$ (gain) in FIG.

2 indicates a value corrected as a converted TV value according to a setup value (AGC setup value) in the AGC amplifier 105 (SG section 126 executing gain control thereof) when correcting ΔTV in FIG. 3 as a gain for the AGC amplifier 105. Namely, ΔTV generated as a difference between a TV value based on a theoretical value and that based on a load value is corrected as a gain in the AGC amplifier 105 to obtain appropriate exposure, and a quantity corrected as a gain according to the AGC setup value is used as ΔTV (gain) in conversion of a TV value.

For instance, in a case where it is necessary to select TV10 for obtaining appropriate exposure, a load value corresponding to the theoretical value TV10 is "263" as shown in FIG. 3. If the AGC setup value is the initial value (20H) as shown in FIG. 2, a difference ΔTV between a TV value based on a theoretical value and that based on a load value is −0.0789 as shown in FIG. 3, so that, by setting the AGC setup value to "35", the ΔTV (gain) is corrected by 0.0789, thus appropriate exposure being realized.

In the digital camera according to this embodiment, when gain control for the AGC amplifier 105 is executed by the CPU 121 as well as by the SG section 126, control is provided so that, of quantization errors, a quantization error generated when the shutter speed is set to the higher speed side will be offset.

Generally in gain control for the AGC amplifier 105, if an initial value of the AGC setup value is set to a value insuring an excellent image ("20H" in FIG. 2), linearity of a gain against a setup value is lost in a direction in which a gain is lowered, and for this reason, when a shutter speed is set, a quantization error is set so that the shutter speed will be in the higher speed side to correct the shutter speed by making a gain larger.

For instance, in FIG. 3, when the theoretical value TV is 10.125, the shutter speed based on the theoretical value is "$1/1116.68$ [sec]", but an error is generated in the shutter speed in a load value based on an unit of the CCD electric charge sweep-away pulse XSUB. Namely, only the values of "263 (shutter speed: $1/1081.53$ [sec])" and "262 (shutter speed: $1/1161.36$ [sec])" are available as selectable load values.

Herein the load value "263" is a shutter speed closer to the theoretical value, but in this embodiment, of the shutter speeds close to the theoretical value, the load value "262", which is a shutter speed in the high-speed side, is selected as the shutter speed. In this case, ΔTV is equal to −0.0566, so that, by setting the AGC setup value to "34", the ΔTV (gain) is corrected by "0.0566", thus appropriate exposure being realized.

As described above, by setting a quantization error in the high-speed side of the shutter speed (gain in the plus side), a section having linearity against a setup value can be used in gain control for the AGC amplifier 105.

Further, the control form is like that in gain control for the AGC amplifier 105 executed in imaging under low illuminance, which is advantageous for system designing. Namely, under low illuminance, the shutter speed becomes lower, and vibration caused by manual operation easily occurs. So, when the shutter speed is lower than a certain value which is, for instance, 1/60 [sec], 1/60 [sec] at which vibration by manual operation does not occur is selected as the shutter speed, and the difference ΔTV between the value and the shutter speed theoretically to be set is used as a gain for the AGC amplifier 105 for correction.

At last description is made for operations for setting a shutter speed in this digital camera. At first, an operator selects the imaging mode via the operating section 123. The CPU determines exposure according to brightness data from the IPP 107, and controls the CCD electric charge read pulse XSG and CCD electric charge sweep-away pulse XSUB according to a result of determination on exposure.

The CPU 121 computes a TV value, decides from the TV value a shutter speed (load value) to be set in the IPP 107 and an AGC value to be set in the AGC amplifier 105 by referring to the ROM table 121a shown in FIG. 3, and sets a gain for the AGC amplifier 105 via the SG section 126 according to the control signal group C3.

It should be noted that, although an AGC amplifier having no linearity in the minus side of gain (ΔAT) as shown in FIG. 2 is used in the embodiment described above, also it is possible to set a quantization error in the lower side of the shutter speed (namely gain in the minus side) in a case where an AGC amplifier having linearity in the minus side of gain is used.

FIG. 4 is a chart showing contents of the ROM table 121a for correcting a gain to the minus side. For instance, in FIG. 4, when a theoretical value TV is 10.125, the shutter speed based on the theoretical value is "$1/1116.68$ [sec]", but a quantization error is generated in the shutter speed if a load value based on the CCD electric charge sweep-away pulse XSUB is used. In this case, as shown in FIG. 4, the value of "263" (shutter speed: $1/1081.53$ [sec]) is set as a load value.

For this reason, in this case, the quantization error ΔTV is 0.0461, so that, by setting the AGC setup value to "31", the ΔTV (gain) is corrected by −0.0461, thus appropriate exposure being realized.

In Embodiment 1 described above, an example was shown in which a signal level of an image signal for the CCD 103 is corrected by controlling a gain for the AGC amplifier 105, but in Embodiment 2 of the present invention, a signal level of an image signal for the CCD 103 is corrected by controlling a gain for the digital gain adjusting section 1075 in the IPP 107. For this reason, description is made only for different portions.

The digital camera according to Embodiment 2 may has the same block configuration as that of the digital camera (shown in FIG. 1) according to Embodiment 1.

FIG. 5 is a view showing detailed configuration of the IPP 107 shown in FIG. 1.

The IPP 107 comprises a color separating section 1071 for separating digital image data inputted from the A/D converter 106 to color components for R,G, and B; a signal interpolating section 1072 for interpolating each separated image data for R and B; a pedestal adjusting section 1073 for adjusting black level of each image data for R, G, and B; a white balance adjusting section 1074 for adjusting a white level of each image data for R, G and B; a digital gain adjusting section 1075 for correcting each image data for R, G, and B with a gain set by the CPU 121; a gamma conversion section 1076 for subjecting each image data for R,G, and B to γ conversion; a matrix section 1077 for separating each image data for R, G, and B to a color difference signal (Cb, Cr) and a brightness signal (Y); a video signal processing section 1078 for generating a vide signal depending on the color difference signal (Cb, Cr) and the brightness signal (Y) and outputting the vide signal to the display section 122; a CPU I/F 1079 which is an interface with the CPU 121; and a DCT I/F 1080 which is an interface with the DCT 108.

The digital gain adjusting section 1075 described above has multipliers 1075r, 1075g, 1075b for R, G and B respectively, and image data for R, G, and B inputted to the multipliers 1075r, 1075g, 1075b respectively are multiplied by each gain data for R, G, and B set by the CPU 121 to adjust a signal level of each image data for R, G, and B.

Also in this embodiment, an operating speed of the electronic shutter is set by a unit of CCD sensor electronic charge sweep-away pulse XSUB like in Embodiment 1.

Also in this embodiment, a case is allowable where a diaphragm can be set only step by step due to restrictions in system designing for an apparatus or because of requirements in cost reduction for the apparatus. Namely, as for the EV diagram, like in the conventional technology, only F2 and F8 are available as an F value as shown in FIG. 12, and for switching it, F2 is selected in a range up to Lv12, and F8 is selected in a range from Lv12 and on.

Next description is made for gain control for the digital gain adjusting section 1075 in the IPP 107 which is a feature in this embodiment. Namely, in this embodiment, when a signal level of an image signal for the CCD 103 is corrected with the digital adjusting section 1075 in the IPP 107, a gain for the digital gain adjusting section 1075 is controlled by the CPU 121 so that a quantization error or an exposure error generated when a shutter speed is set by a unit of CCD electric charge sweep-away pulse XSUB will be offset.

Also in this embodiment, a gain setup value is decided by using the ROM table 121a used in FIG. 3. For instance, if it is necessary to set a TV value to 10 for realizing appropriate exposure, a load value corresponding to the theoretical value of TV10 is "263" as understood from FIG. 3. Also in this case, a difference ΔTV between TV based on the theoretical value and that based on the load value is –0.0789 as understood from FIG. 3, so that appropriate exposure can be obtained by correcting the ΔTV (gain) in the digital gain adjusting section 1075 by "0.0789".

Figure 6:
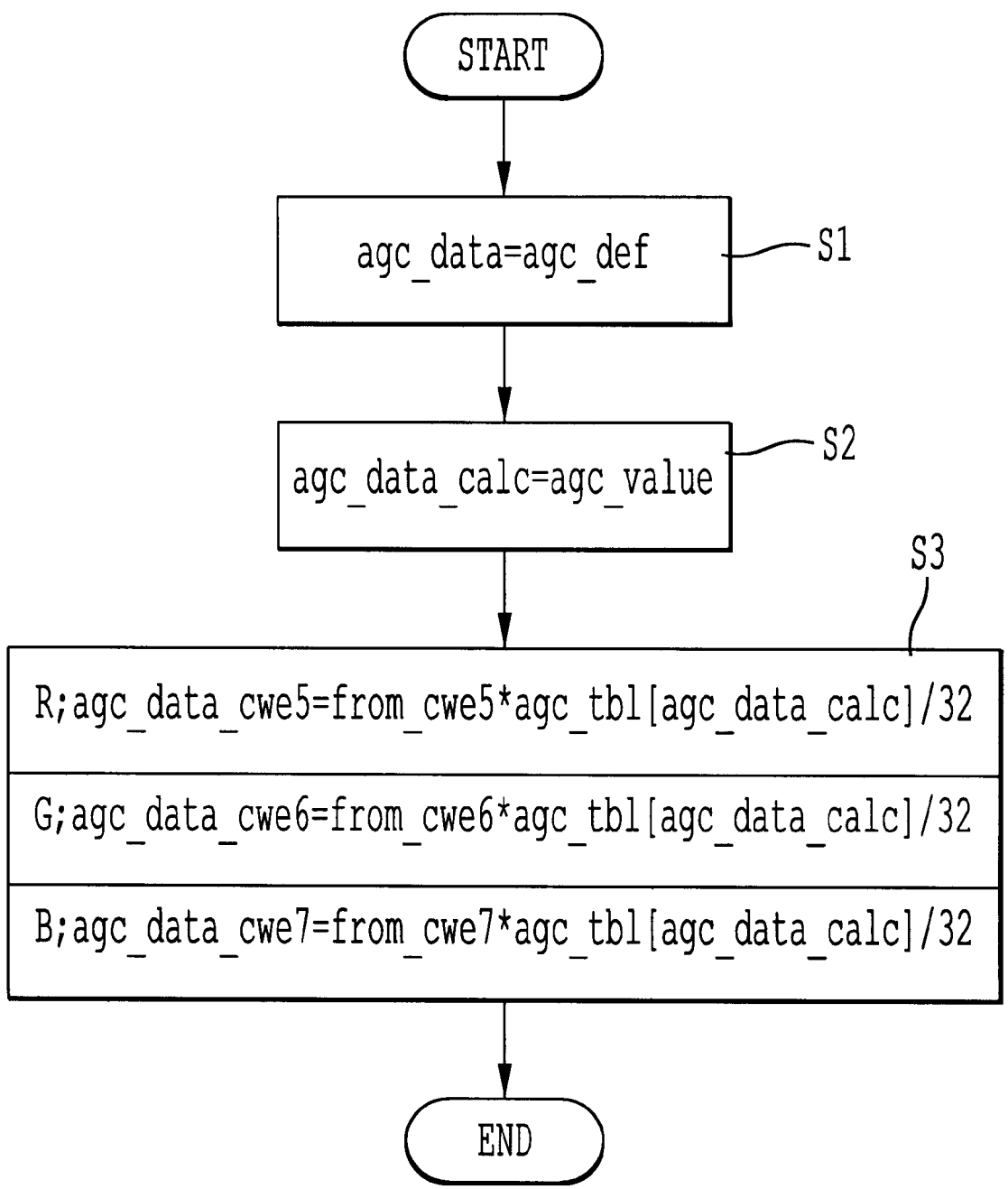
FIG. 6 is a flowchart for illustrating a method for computing gain data multiplied in a digital gain adjusting section.

Then, description is made for a method of computing gain data multiplied in the digital gain adjusting section 1075 according to an AGC setup value with reference to the flowchart shown in FIG. 6.

FIG. 6 is a flowchart for illustrating a method of computing gain data to be multiplied in the digital gain adjusting section 1075.

At first, description is made for parameters used in the flow chart in FIG. 6.

A unit of the parameters described below is EV (The same meaning is provided even with Lv, TV, and AV), and 1/16 EV is 1.

1) agc_value: A gain setup value, which corresponds to a gain (ΔTV) for correcting a quantization error ΔTV in the table shown in FIG. 3 and is expressed with hexadecimal numbers. When the quantization error ΔTV in FIG. 3 is minus, the agc_value becomes plus. Namely the agc_value becomes plus when a gain is made larger, and becomes minus when a gain is made smaller.

2) agc_data: D/A output setting data for the CPU 121, and a gain for the AGC amplifier 105 can be set with this data.

3) agc_def: An input control voltage value for the AGC amplifier, when a gain for the AGC amplifier 15 is 1 time (D/A setup value for the CPU)

4) agc_data_cwe 5–7: Gain data for R, G, and B multiplied in the multipliers 1075r, 1075g, 1075c in the digital gain adjusting section 1075 in the IPP 107.

5) from_cwe 5–7: Adjusting values for colors for R, G, and B in the CCD 103

6) agc_tbl [agc_data_calc]: A function for AGC computing agc_tbl [0–32]={32, 33, 34, 36, 38, 39, 41, 43, 45, 47, 49, 51, 53, 56, 58, 61, 64, 66, 69, 72, 76, 79, 83, 86, 90, 94, 98, 103, 107, 112, 117, 122, 128}

Specifically, agc_tbl [0]=32, agc_tbl [32]=128

In a case where agc_tbl [agc_data_calc] is [32], the gain data is 1 time (+0 EV), in a case of [64], the gain data is 2 times (+1 EV), and in a case of [128], the gain data is 4 times (+2 EV).

In FIG. 6, at first, in step S1, agc_data is made equal to agc_def, and then agc_data_calc is made equal to agc_value (step S2). And, gain data for R, namely agc_data_cwe 5 is made equal to agc_from_cwe 5 *agc_tbl [agc_data_calc]/32, gain data for G, namely agc_data_cwe is made equal to agc_from_cwe 6 *agc_tbl [agc_data_calc]/32, and also gain data for B, namely agc_data_cwe 5 is made equal to agc_from_cwe 7 * agc_tbl [agc_data_calc]/32 (step 32), and then this operating flow ends.

The agc_data_cwe 5–7 computed in the above processing for computing a gain is multiplied as a gain in the multipliers 1075r, 1075g, and 1075c for R, G, and B in the digital gain adjusting section 1075 in the IPP 107, and the computed agc_data is set as a gain for the AGC amplifier 105.

Thus, a signal level of an image signal is corrected by controlling a gain for the digital gain adjusting section 1075, so that gain adjustment in a broad range becomes possible and also it becomes possible to correct a signal level of an image signal in a broad range.

Finally, description is made for operations for setting a shutter speed in the digital camera. At first, an operator selects the imaging mode via the operating section 123. The CPU 121 determines exposure according to illuminance data from the IPP 107, and controls the CCD electric charge read pulse XSG and CCD electric charge sweep-away pulse XSUB according to a result of the determination of exposure. Also the CPU 121 computes a TV value, and decides a shutter speed (load value) to be set in the IPP 107 from the TV value by referring to the ROM table 121a.

Then the CPU 121 computes gain data (agc_data_cwe 5–7) for R, G, and B multiplied in the multipliers 1075r, 1075g, and 1075c in the digital gain adjusting section 1075 referring to the ROM table 121a shown in FIG. 3, multiplies the computed gain data for R, G, and B with the multipliers 1075r, 1075g, and 1075c in the digital gain adjusting section 1075 in the IPP 107 for adjusting a signal level of an image signal.

The above description assumes a case where a gain for the digital gain adjusting section 1075 is adjusted using a table shown in FIG. 3 in which a gain is set to the plus side (Refer to FIG. 3), but gain adjustment for the gain adjusting section 1075 may be executed using the table shown in FIG. 4 in which a gain is set to the minus side.

In the AGC amplifier, a section having linearity in a gain for a setup value is limited, while gain adjustment can be made with the digital gain adjusting section 1075 in a broad range.

In Embodiment 3 of the present invention, a signal level of an image signal for the CCD 103 is corrected by using a gain for the AGC amplifier 105 as well as for the digital gain adjusting section 1075 in the IPP 107. For this reason, description is made only different portions.

The digital camera according to Embodiment 3 may have the same configuration as that of the digital camera described in Embodiment 1 (Refer to FIG. 1), and also the IPP 107 may have the configuration as that described in Embodiment 2 and shown in FIG. 5.

Also in this embodiment, an operating speed of an electronic shutter is set by a unit of the CCD sensor electric charge sweep-away pulse XSUB like in Embodiment 1.

Also in this embodiment, there may be a case where a diaphragm can be set only step by step due to restrictions in system designing for an apparatus or because of requirements for cost reduction for the apparatus. Namely, in the case, as for the EV diagram, like in the conventional technology, only F2 and F8 are available for selecting as an F value as shown in FIG. 12, and for switching it, F2 is selected in a range up to Lv12, and F8 is selected in a range from Lv12 and on.

Next description is made for gain control for the AGC amplifier 105 as well as for the IPP 107, which is one of the features in this embodiment.

In this embodiment, when a signal level of an image signal for the CCD 103 is corrected by the AGC amplifier 105 as well as by the gain adjusting section 1075 in the IPP 107, a gain for the AGC amplifier 105 is controlled by the CPU 121 and SG section 126, or a gain for the digital gain adjusting section 1075 in the IPP 107 is controlled by the CPU 121, so that a quantization error or an exposure error generated when a shutter speed is set by a unit of CCD electric charge sweep-away pulse XSUB will be offset.

Generally, in gain control for the AGC amplifier 105, if an initial value is set to a value insuring an excellent image, there is no linearity in a gain for a setup value in a direction in which a gain is lowered (in a direction where a gain is minus), so that, in the AGC amplifier 105, in a case where a quantization error is set to the higher speed side of the shutter speed, a signal level of an image signal is corrected by raising a gain (in a direction where a gain is plus), on the contrary, in gain control for the digital gain adjusting section 1075, gain adjustment can be made in a broad range (in a direction where a gain is minus and also in a direction where a gain is plus), so that, in a case where a quantization error is set to the lower speed side of the shutter speed, a signal level of an image signal is adjusted by lowering a gain (in a direction where a gain is minus).

Namely in this embodiment, gain control for the AGC amplifier 105 is executed using a table shown in FIG. 3 in which a gain is plus, and gain control for the digital gain adjusting section 1075 in the IPP 107 is executed using the table shown in FIG. 4 in which a gain is minus.

As for a criteria as to which of the table shown in FIG. 3 and that shown in FIG. 4 should be selected, for instance, a table, in which an absolute value of a quantization error $\Delta TV$ from a theoretical value of the shutter speed becomes smaller, may be selected. Concretely, in a case where it is necessary to set a tTV value to 10.125, in the table shown in FIG. 3, as load value corresponding to the theoretical value TV of 10.125 is 262, and the quantization error $\Delta TV$ then is −0.0566. On the other hand, in the table shown in FIG. 4, a load value corresponding to the theoretical value TV of 10.125 is 262, and the quantization error $\Delta TV$ then is 0.0461. For this reason, in a case where it is necessary to set a time value TV to 10.125, it is necessary to use the table shown in FIG. 4 in which an absolute value of the quantization error is smaller. With this, a change rate in a gain can be made smaller.

FIG. 7 is a view for illustrating a relation between an input control voltage (V) and an output gain (dB) in the AGC amplifier 105 according to this embodiment.

The curve in FIG. 7 shows characteristics of the input control voltage (V) and output gain (dB) when a control voltage Vcc is set to 4.5 V, 4.75 V, and 5 V respectively. As shown in FIG. 7, in a case where an output gain (dB) is not more than 8 dB, linearity is lost.

Next description is made for a method of computing gain data set in the AGC amplifier 105 and in the digital gain adjusting section 1075.

Figure 8A:
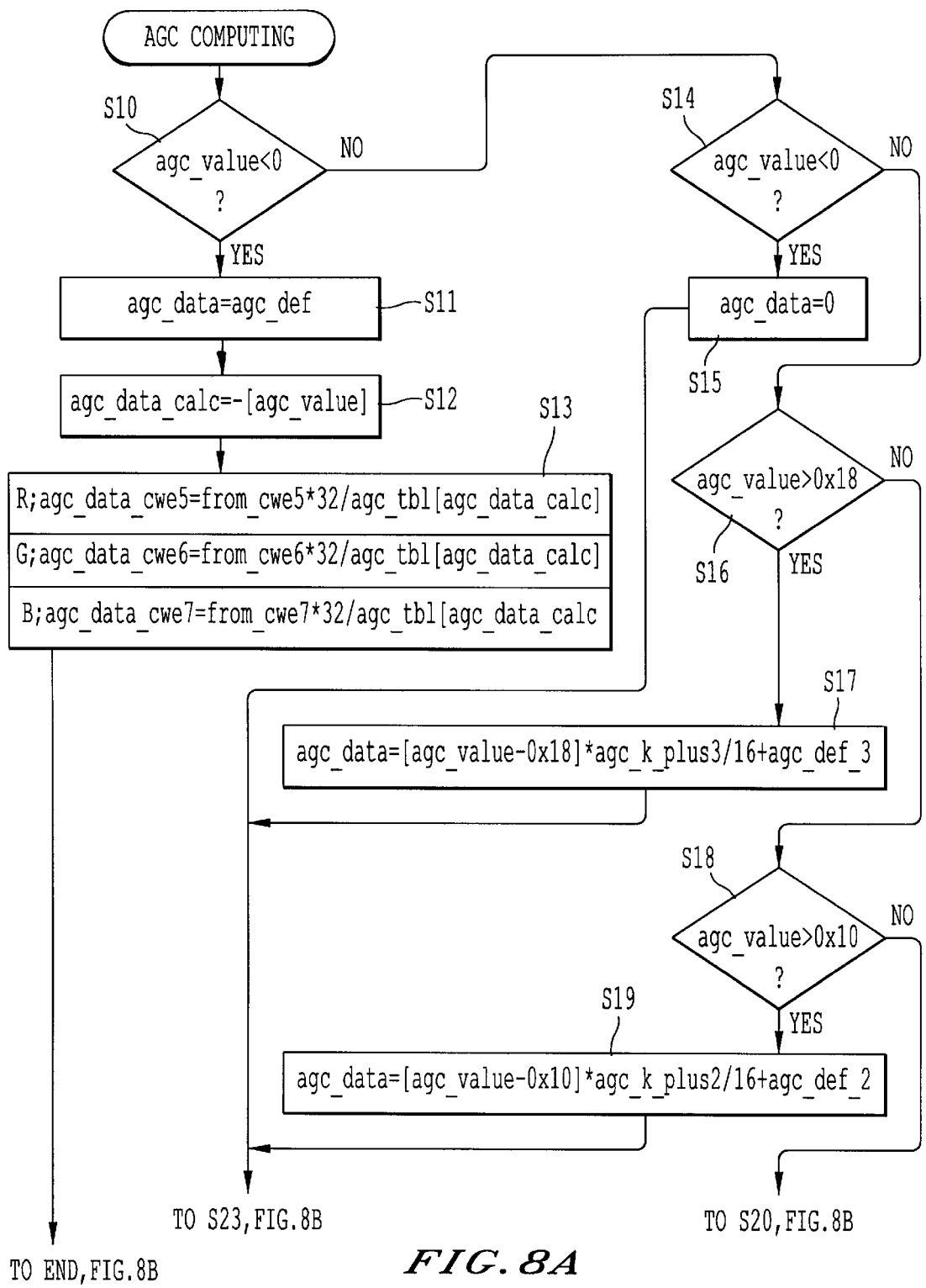
FIG. 8 is a flowchart for illustrating a method for computing gain data set in the AGC amplifier as well as in the digital gain adjusting section.
Figure 8B:
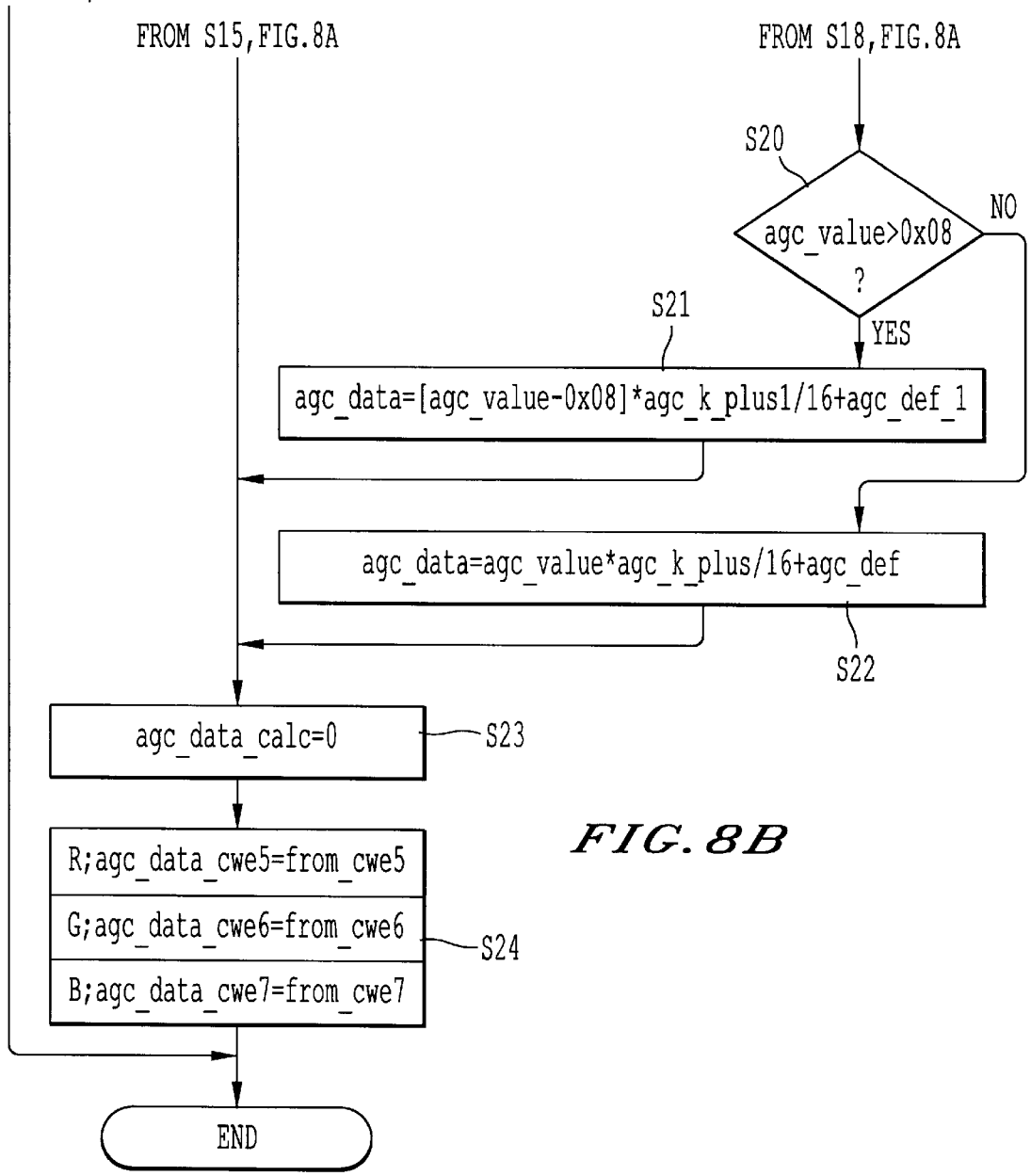
Figure 9:
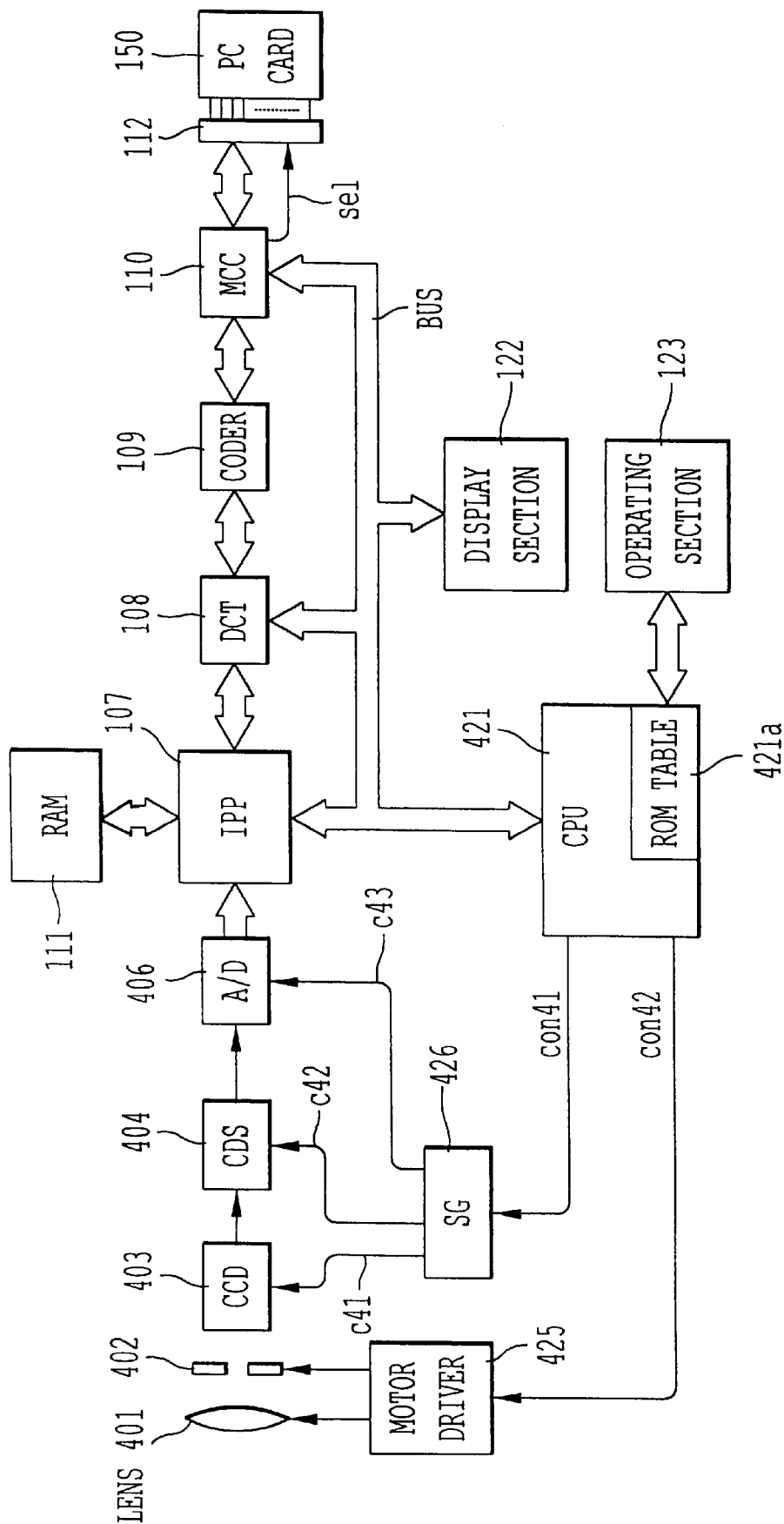
FIG. 9 is a block diagram showing configuration of a representative digital camera based on the conventional technology.

FIG. 8 is a flowchart for showing a method for computing gain data set in the AGC amplifier 105 and in the digital gain adjusting section 1075.

At first, description is made for parameters used in the flow chart shown in FIG. 8.

A unit of the parameters described below is EV (The same meaning is provided even with Lv, TV, and AV), and $\frac{1}{16}$ EV is 1.

1) agc_value: A gain setup value, which corresponds to a gain ($\Delta TV$) for correcting a quantization error $\Delta TV$ in the tables in FIG. 3 and FIG. 4 (expressed with hexadecimal numbers). In a case where the quantization error $\Delta TV$ becomes minus as shown in FIG. 3, agc_value becomes plus, while, in a case where the quantization error $\Delta TV$ becomes plus as shown in FIG. 4, the agc_value becomes minus. Namely, the agc_value becomes plus when a gain is to be made larger, and becomes minus when a gain is to be made smaller.

Concretely, a relation between agc_value and an output gain (dB) for the AGC amplifier 105 is as described below. When agc_value is zero (0), and output gain for the AGC amplifier 105 is 8 dB; when agc_value is 0×08, an output gain for the AGC amplifier 105 is 8+(6*0.5), namely 11 dB; when agc_value is 0×10, an output gain for the AGC amplifier 105 is 8+(6 *1.0), namely 14 dB; and when agc_value is 0×18, an output gain for the AGC amplifier 105 is 8+(6*1.5), namely 17 dB.

2) agc_data : D/A output setup data for the CPU 121. With this data, a gain for the AGC amplifier 105 can be set.

3) agc data cwe 5–7: Gain data for R, G, and B multiplied in the multipliers 1075r, 1075g, 1075c in the digital gain adjusting section 1075 in the IPP 107.

4) from_cwe 5–7: Adjusting value for non-uniformity in colors R, G, and B in the CCD 103.

5) agc_k_plus, agc_k_plus 1–3: Output gain (dB) against input control voltage in each section at which a gain for the AGC amplifier 105 does not linearly change against a setup value (D/A value).

Concretely, agc_k_plus indicates an increase factor of an output gain (dB) against an input control voltage in a range from 8 dB to 11 dB; agc_k_plus_1 indicates an increase factor of an output gain against an input control voltage in a range from 11 dB to 14 dB; agc_k_plus_2 indicates an increase factor against an input control voltage in an area from 14 dB to 17 dB; and agc_k_plus_3 indicates an increase factor of an output gain against an input control voltage in a range of 17 dB or higher.

6) agc_def, agc_def 1–3: Shift value for agc_k_plus, and agc_k_plus 1–3. Concretely, agc_def indicates an input control voltage value (D/A setup value for the CPU) for an output gain of 8 dB for the AGC amplifier 105; agc_def_1 indicates an input control voltage value (D/A setup value for the CPU) for an output gain of 11 dB for the AGC amplifier 105; agc_def_2 indicates an input control voltage value (D/A setup value for the CPU) for an output gain of 14 dB for the AGC amplifier 105; and agc_def_3 indicates an input control voltage value (D/A setup value for the CPU) for an output gain of 17 dB for the AGC amplifier 105.

7) agc_tbl [agc_data_calc] :A function for AGC computing agc_tbl [0–32]={32, 33, 34, 36, 38, 39, 41, 43, 45, 47, 49, 51, 53, 56, 58, 61, 64, 66, 69, 72, 76, 79, 83, 86, 90, 94, 98, 103, 107, 112, 117, 122, 128}

Concretely, agc_tbl [0] is equal to 32, and agc_tbl [32] is equal to 128.

In a case where agc_tbl [agc_data_calc] is [32], gain data is 1 time (±0 EV); in a case where agc_tbl [agc_data_ calc] is [64], gain data is ½ times (−1 EV); and in a case where agc_tbl [agc_data_calc] is [128], gain data is ¼ times (−2 EV).

Next description is made for the flowchart in FIG. 8. In FIG. 8, at first, determination is made as to whether agc_ value is smaller than [0] or not (step S10), and in a case where it is determined that agc_value is smaller than [0], system control shifts to step S11, and in a case where it is determined that agc_value is not less than [0], system control shifts to step S14.

In step S11, agc_data is made equal to agc_def, and then agc_data_calc is made equal to −(agc_value) (step S3). Then gain data for R, i.e., agc_data_cwe 5 is made equal to agc_from_cwe 5\*32/agc_tbl [agc_data_calc]; gain data for G, i.e., agc_data_cwe6 is made equal to agc_from_cwe6\*32/agc_tbl [agc_data_calc]; and gain data for B, i.e., agc_data_cwe5 is made equal to agc_from_cwe7\*32/agc_tbl [agc_data_calc] (step 4), and then the flow is terminated.

In step S14, determination is made as to whether agc_ value is [0] or not, and in a case where it is determined that agc_value is not [0], system control shifts to step S16, and in a case where it is determined that agc_value is [0], system control shifts to step S15 with agc_data set to 0, and then system control shifts to step S23.

In step S16, determination is made as to whether agc_ value is larger than [0×18] or not, and in a case where it is determined that agc_value is not more than [0×18], system control shifts to step S18, and in a case where agc_value is lager than [0×18], agc_data is set to (agc_value−0×18) * agc_k_plus³⁄₁₆+agc_def_3 (step S17), and then system control shifts to step S23.

In step S18, determination is made as to whether agc_ value is larger than [0×10] or not, and in a case where it is determined that agc_value is not more than [0×10], system control shifts to step S20, and in a case where it is determined that agc_value is larger than [0×10], agc_data is set to (agc_value−0×10) \*agc_k_plus²⁄₁₆+agc_def_2 (step S19), and system control shifts to step S23.

In step S20, determination is made as to whether agc_ value is larger than [0×08] or not, and in a case where it is determined that agc_value is not more than [0×08], system control shifts to step S22, and in a case where it is determined that agc_value is larger than [0×08], agc_data is set to (agc_value−0×08) \*agc_k_plus¹⁄₁₆+agc_def_1 (step S21) with the system control shifted to step S23.

In step S22, agc_data is set to agc_value\*agc_k_plus/ 16+agc_def, and system control shifts to step S23.

In step S23, agc_data_calc is set to zero (0), and then gain data for R, i.e., agc_data_cwe5 is set to agc_from_cwe5, gain data for G, i.e., agc_data_cwe6 to agc_from_cwe6, and further gain data for B. i.e., agc_data_cwe5 to agc_from_cwe7 (step S24), and then this flow comes to the end.

The agc_data_cwe 5 to 7 computed in the above sequence is multiplied as gain with the multipliers 1075r, 1075g, and 1075b for R, G, and B in the digital gain adjusting section 1075 in the IPP 107, and also the agc_data computed in the above sequence is set as a gain for the AGC amplifier 105.

As described above, in gain control for the AGC amplifier 105, a section having linearity in a gain for a setup value for the AGC amplifier 105 is used (in a direction in which a gain is plus), and as for a range in which there is no linearity in a gain for the AGC amplifier 105 (in a direction in which a gain is minus), gain adjustment is executed by the digital gain adjusting unit 1075, so that gain adjustment can be made in a broad range and a signal level of an image signal can be corrected in a broad range.

Next description is made for operations for setting a shutter speed in the digital camera. At first, an operator sets the imaging mode via the operating section 123. The CPU 121 determines exposure according to illuminance data from the IPP 107, and controls the CCD electric charge read pulse XSG and CCD electric charge sweep-away pulse XSUB in response to a result of the determination of exposure.

The CPU 121 computes a TV value, and decides a shutter to be set (a load value) in the IPP 107 from the TV value by referring to the ROM table 121a shown in FIG. 3 or FIG. 4. Then, the CPU 121 computes gain data (agc_data) to be set in the AGC 105 and gain data for R, G, and B to be multiplied with the multipliers 1075r, 1075g, 1075b in the digital gain adjusting section 1075.

Then, the CPU 121 sets the computed gain data (agc_data) in the AGC amplifier 105, and also multiplies the computed gain data for R, G, and B (agc_data_cwe 5–7) with the multipliers 1075r, 1075g, and 1075c in the digital gain adjusting section 1075 for adjusting a signal level of an image signal.

This application is based on Japanese patent applications No. HEI 8-190289 and No. HEI 9-190278 filed in the Japanese Patent Office on Jul. 19, 1996 and Jul. 15, 1997, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital camera having a CCD as an image pickup device for imaging an object and setting a shutter speed by a pulse unit for electric charge sweep-away control for said CCD comprising:

a variable gain amplifier for correcting a signal level of an image signal for said CCD;

a control means for controlling a gain in said variable gain amplifier so that quantization errors generated when a shutter speed is set by a pulse unit for sweeping away an electric charge in said CCD will be offset.

2. A digital camera according to claim 1; wherein said controller has a data table which maintains a shutter speed set against a time value (TV) in exposure adjustment and a quantization error in a tabular format.

3. A digital camera according to claim 1; wherein said controller controls a gain in said variable gain amplifier so that, of the quantization error s, especially a quantization error generated when a shutter speed is set to a high-speed side will be offset.

4. A digital camera according to claim 3; wherein said controller has a data table which maintains a shutter speed set against a time value (TV) in exposure adjustment and a quantization error in a tabular format.

5. A digital camera having a CCD as an image pickup device for imaging an object and setting a shutter speed by a pulse unit for electric charge sweep-away control for said CCD comprising:

a digital gain adjuster for correcting a signal level of an image signal for said CCD; and a controller for controlling a gain in said digital gain adjuster so that quantization errors generated when a shutter speed is set by a pulse unit for sweeping away an electric charge in said CCD will be offset.

6. A digital camera according to claim 5; wherein said digital gain adjuster comprises multipliers provided for each of RGB and adjusts a signal level of an image signal by multiplying RGB image signals inputted into said multipliers by gain data computed by said controller.

7. A digital camera having a CCD as an image pickup device for imaging an object and setting a shutter speed by a pulse unit for electric charge sweep-away control for said CCD comprising:

a variable gain amplifier for correcting a signal level of an image signal for said CCD;

a digital gain adjuster for correcting a signal level of an image signal for said CCD; and a controller for controlling a gain in at least one of said variable gain amplifier and said digital gain adjuster so that quantization errors generated when a shutter speed is set by a pulse unit for sweeping away an electric charge in said CCD will be offset.

8. A digital camera according to claim 7; wherein said controller controls a gain in said variable gain amplifier so that, of said quantization errors, a quantization error generated when a shutter speed is set to the high-speed side will be offset, and also controls a gain in said digital gain adjuster so that, of said quantization errors, a quantization error generated when a shutter speed is set to the low-speed side will be offset.

9. A digital camera having a CCD as an image pickup means for imaging an object and setting a shutter speed by a pulse unit for electric charge sweep-away control for said CCD comprising:

a variable gain amplifying means for correcting a signal level of an image signal for said CCD;

a control means for controlling a gain in said variable gain amplifying means so that quantization errors generated when a shutter speed is set by a pulse unit for sweeping away an electric charge in said CCD will be offset.

10. A digital camera according to claim 9; wherein said control means has a data table which maintains a shutter speed set against a time value (TV) in exposure adjustment and a particular quantization error in a tabular format.

11. A digital camera according to claim 9; wherein said control means controls a gain in said variable gain amplifying means so that, of the quantization errors, especially a quantization error generated when a shutter speed is set to a high-speed side will be offset.

12. A digital camera according to claim 11; wherein said control means has a data table which maintains a shutter speed set against a time value (TV) in exposure adjustment and a particular quantization error in a tabular format.

13. A digital camera having a CCD as an image pickup means for imaging an object and setting a shutter speed by a pulse unit for electric charge sweep-away control for said CCD comprising:

a digital gain adjusting means for correcting a signal level of an image signal for said CCD; and a control means for controlling a gain in said digital gain adjusting means so that quantization errors generated when a shutter speed is set by a pulse unit for sweeping away an electric charge in said CCD will be offset.

14. A digital camera according to claim 13; wherein said digital gain adjusting means comprises multipliers provided for each of RGB and adjusts a signal level of an image signal by multiplying RGB image signals inputted into said multipliers by gain data computed by said control means.

15. A digital camera having a CCD as an image pickup means for imaging an object and setting a shutter speed by a pulse unit for electric charge sweep-away control for said CCD comprising:

a variable gain amplifying means for correcting a signal level of an image signal for said CCD;

a digital gain adjusting means for correcting a signal level of an image signal for said CCD; and a control means for controlling a gain in at least one of said variable gain amplifying means and said digital gain adjusting means so that quantization errors generated when a shutter speed is set by a pulse unit for sweeping away an electric charge in said CCD will be offset.

16. A digital camera according to claim 15; wherein said control means controls a gain in said variable gain amplifying means so that, of said quantization errors, a quantization error generated when a shutter speed is set to the high-speed side will be offset, and also controls a gain in said digital gain adjusting means so that, of said quantization errors, a quantization error generated when a shutter speed is set to the low-speed side will be offset.

* * * * *